(12) United States Patent
Farhangi et al.

(10) Patent No.: US 12,738,892 B2
(45) Date of Patent: Sep. 15, 2026

(54) RAPID SHUTDOWN DEVICE FOR PHOTOVOLTAIC MODULES

(71) Applicant: GAF Energy LLC, Parsippany, NJ (US)

(72) Inventors: Babak Farhangi, Kew Gardens Hills, NY (US); Hasib Amin, San Jose, CA (US); Lewis Abra, San Francisco, CA (US); Richard Perkins, San Jose, CA (US)

(73) Assignee: GAF Energy LLC, Parsippany, NJ (US)

(*) Notice: Subject to any disclaimer, the term of this patent is extended or adjusted under 35 U.S.C. 154(b) by 0 days.

(21) Appl. No.: 19/053,135

(22) Filed: Feb. 13, 2025

(65) Prior Publication Data

US 2025/0202426 A1 Jun. 19, 2025

Related U.S. Application Data

(63) Continuation of application No. 18/887,743, filed on Sep. 17, 2024, now Pat. No. 12,255,581, which is a continuation of application No. 18/485,883, filed on Oct. 12, 2023, now Pat. No. 12,255,580, which is a
(Continued)

(51) Int. Cl.

| | |
|---|---|
| ***H02S 50/00*** | (2014.01) |
| ***H02S 20/25*** | (2014.01) |
| ***H02S 40/34*** | (2014.01) |
| *H02H 7/20* | (2006.01) |

(Continued)

(52) U.S. Cl.
CPC .............. *H02S 50/00* (2013.01); *H02S 20/25* (2014.12); *H02S 40/34* (2014.12); *H02H 7/20* (2013.01); *H02J 7/35* (2013.01); *H02J 2101/24* (2026.01); *Y02E 10/56* (2013.01); *Y02E 40/70* (2013.01)

(58) Field of Classification Search
CPC .......... H02S 50/00; H02S 20/25; H02S 40/34; H02S 40/36; H02H 7/20; H02J 7/35; H02J 2101/24; Y02E 10/56; Y02E 40/70; Y02B 10/10
See application file for complete search history.

(56) References Cited

U.S. PATENT DOCUMENTS

| | | | | |
|---|---|---|---|---|
| 2012/0033392 A1* | 2/2012 | Golubovic | H02S 40/34 | 361/752 |
| 2016/0329715 A1* | 11/2016 | Orr | H02S 50/10 | |
| 2017/0077343 A1* | 3/2017 | Morad | H10F 19/80 | |

* cited by examiner

*Primary Examiner* — Michael Y Sun
(74) *Attorney, Agent, or Firm* — GREENBERG TRAURIG, LLP

(57) ABSTRACT

A rapid shutdown device for rapidly de-energizing a photovoltaic module system is disclosed. The rapid shutdown device includes power lines connected to a photovoltaic string of modules on a roof of a structure. A high voltage switch on a first power line is disconnected when the high voltage switch is open. The rapid shutdown device includes a gate drive circuit that receives an electronic photovoltaic string status signal associated with an operating status of the photovoltaic string. The date drive circuit may determine that the operating status indicates the presence of a hazard based on the electronic photovoltaic string status signal. Based on the presence of the hazard, the rapid shutdown device generates a high voltage switch command signal to cause the high voltage switch to open to disconnect the photovoltaic string from an electrical connection to a grid power supply, thereby enhancing protection of the string and safety for responders.

13 Claims, 18 Drawing Sheets

Related U.S. Application Data continuation of application No. 18/066,241, filed on Dec. 14, 2022, now Pat. No. 11,811,361.

(51) Int. Cl.

| | |
|---|---|
| *H02J 7/35* | (2006.01) |
| *H02J 101/24* | (2026.01) |

RAPID SHUTDOWN DEVICE FOR PHOTOVOLTAIC MODULES

FIELD OF THE INVENTION

The present application relates to photovoltaic modules, rapid shutdown device technologies, roofing accessories and technologies, and, more particularly, to a rapid shutdown device for photovoltaic modules.

BACKGROUND

Photovoltaic modules are utilized on roofing of structures to absorb sunlight to generate energy that may be converted for use on an electrical grid. Rapid shutdown devices that reduce or turn off the voltage to photovoltaic modules in the event of an emergency or hazard are required by law, such as in United States markets. Optimized rapid shutdown devices may enhance safety, while simultaneously providing greater protection to a photovoltaic module system and structure upon which the roof is installed.

SUMMARY

In certain embodiments, a system comprises a photovoltaic string that includes a plurality of photovoltaic modules. In certain embodiments, the photovoltaic string may be installed on a roof of a structure and each photovoltaic module of the plurality of photovoltaic modules may include a first layer on a roof deck of the roof and a second layer having at least one photovoltaic cell. In certain embodiments, the second layer may be opposite to the roof deck. In certain embodiments, the system may include at least one electrical connection to a grid power supply associated with and/or providing power for the structure. In certain embodiments, the system may include at least one electronics housing installed on the roof of the structure, wherein the at least one electronics housing houses a rapid shutdown device in electrical communication between the photovoltaic string and the at least one electrical connection to the grid power supply. In certain embodiments, the at least one electronics housing includes a non-conductive material that encompasses the rapid shutdown device. In certain embodiments, the non-conductive material may include, but is not limited to, plastic, glass, rubber, natural and synthetic fibers, and other non-conductive materials, or any combination thereof. Being able to encompass the rapid shutdown device may include, but is not limited to, having the entirety of the rapid shutdown device contained within the electronics housing and/or covering a portion of the rapid shutdown device (e.g., top portion, side portion, middle portion, etc.). In certain embodiments, the rapid shutdown device includes a first power line and a second power line connected (e.g., electrically connected) to the photovoltaic string and a voltage switch (e.g., a high voltage switch) on the first power line. In certain embodiments, a high voltage switch may refer to a blocking voltage of the voltage switch. In certain embodiments, the voltage switch may be configured to electrically disconnect the first power line while the voltage switch is open. In certain embodiments, a variety of switches may be utilized with the rapid shutdown devices described herein including, but not limited to, 4-quadrant switches, relays, microelectromechanical system ("MEMs") switches, current switches, other types of switches, or a combination thereof. In certain embodiments, the voltage switch may be configured to have a blocking voltage exceeding a string voltage. In certain embodiments, the blocking voltage may be determined by the string voltage (e.g., above 600V/100V). In certain embodiments, the string voltage may have a range of 50 volts (V) to 600 V, and the string voltage may be associated with power generated by the photovoltaic string. In certain embodiments, the system may include a gate drive circuit configured to receive at least one electronic photovoltaic string status signal indicative of an operating status of the photovoltaic string, determine that the operating status of the photovoltaic string indicates a hazard based at least in part on the at least one electronic photovoltaic string status signal, and generate, based on the operating status of the photovoltaic string indicating the hazard, a voltage switch command signal configured to cause the voltage switch to open so as to electrically disconnect the photovoltaic string from the at least one electrical connection to the grid power supply with the blocking voltage exceeding the string voltage.

In certain embodiments, wherein each photovoltaic module of the plurality of photovoltaic modules may include at least one sensor device configured to measure the operating status associated with each photovoltaic module. In certain embodiments, the operating status may include a temperature, a temperature rise, an electrical arc event, a moisture level, a voltage, an amperage, a wattage, or any combination thereof. In certain embodiments, the rapid shutdown device includes a communication circuit that is configured to receive the at least one electronic photovoltaic string status signal from the at least one sensor device associated with at least one photovoltaic module of the plurality of photovoltaic modules. In certain embodiments, the communication circuit includes a receiver filter connected to at least one of the first power line or the second power line. In certain embodiments, the receiver filter may be configured to detect at least one power line communication (PLC) comprising the at least one electronic photovoltaic string status signal. In certain embodiments, the communication circuit may include a demodulator configured to extract the at least one electronic photovoltaic string status signal from the at least one PLC. In certain embodiments, the communication circuit may further include an internal power supply configured to convert the voltage generated by the photovoltaic string to a voltage switch power (e.g., high voltage switch power) associated with driving the voltage switch. In certain embodiments, the gate drive circuit may be further configured to receive, from the demodulator, the at least one electronic photovoltaic string status signal. In certain embodiments, the gate drive circuit may be further configured to utilize the voltage switch power from the internal power supply to generate the voltage switch command signal (e.g. high voltage switch command signal) so as to drive the voltage switch. In certain embodiments, the internal power supply includes at least one of at least one isolated power supply with at least one high frequency transformer, at least one multi-stage, non-isolated direct current-to-direct current (DC-DC) converter, at least one charge pump circuit, at least one bootstrap circuit, or any combination thereof.

In certain embodiments, the photovoltaic string further includes at least one wireway configured to house electrical connections to connect each photovoltaic module of the plurality of photovoltaic modules to the rapid shutdown device. In certain embodiments, the at least one wireway may include a non-conductive material. In certain embodiments, the rapid shutdown device and/or an electronics housing configured to house the rapid shutdown device may be configured to fit within the at least one wireway.

In certain embodiments, the system may further include a discharge circuit having a discharge switch between a positive terminal and negative terminal of the rapid shutdown device. In certain embodiments, the discharge circuit may be configured to drive the discharge switch so that the discharge switch is complementary to the voltage switch so as to establish a discharge path between the positive terminal and the negative terminal of the rapid shutdown device.

In certain embodiments, the first layer of one or more of the photovoltaic modules of the string may include an electrically insulating material configured to electrically insulate the roof from one or more of the photovoltaic cells of the second layer of the one or more photovoltaic modules of the photovoltaic string. In certain embodiments, the roof of the structure may be a steep slope roof, other type of roof, or may include a combination of types of roofs. In certain embodiments, the system may include an inverter configured to discharge an inverter voltage associated with the inverter via a discharge circuit of the rapid shutdown device, a discharge circuit of the inverter, or any combination thereof. In certain embodiments, the inverter may be configured to discharge the inverter voltage when the photovoltaic string is electrically disconnected from the at least one electrical connection.

In certain embodiments, a device, such as a rapid shutdown device for a photovoltaic string, is provided. In certain embodiments, the device may include a first power line and a second power line connected to a photovoltaic string comprising a plurality of photovoltaic modules. In certain embodiments, the photovoltaic string may be installed on a roof of a structure and each photovoltaic module of the plurality of photovoltaic modules may include a first layer on a roof deck of the roof and a second layer having at least one photovoltaic cell. In certain embodiments, the device may include a voltage switch (e.g. high voltage switch) on the first power line. In certain embodiments, the voltage switch may be configured to electrically disconnect the first power line while the voltage switch is open. In certain embodiments, the voltage switch is configured to have a blocking voltage exceeding a string voltage. In certain embodiments, the string voltage may be associated with power generated by the photovoltaic string. In certain embodiments, the device may include a gate drive circuit configured to receive an electronic photovoltaic string status signal associated with an operating status of the photovoltaic string. In certain embodiments, the device may also be configured to determine that the operating status of the photovoltaic string indicates a hazard based on the electronic photovoltaic string status signal. In certain embodiments, the device may be further configured to generate, based on the operating status of the photovoltaic string indicating the hazard, a voltage switch command signal (e.g., high voltage switch command signal) configured to cause the voltage switch to open so as to disconnect the photovoltaic string from an electrical connection to the grid power supply.

In certain embodiments, the device may include a receiver filter configured to detect a power line communication including the electronic photovoltaic string status signal. In certain embodiments, the gate drive circuit of the device may be configured to receive a different electronic photovoltaic status string signal associated with a subsequent operating status of the photovoltaic string. In certain embodiments, the gate drive circuit of the device may be configured to determine, based on the different electronic photovoltaic status string signal, that the subsequent operating status of the photovoltaic string indicates that the hazard is no longer present. In certain embodiments, the gate drive circuit of the device may be configured to generate, based on the subsequent operating status indicating that the hazard is no longer present, a subsequent voltage switch command signal configured to cause the voltage switch to close so as to connect the photovoltaic string to the at least one electrical connection to the grid power supply.

In certain embodiments, the device may include an internal power supply configured to adjust the power generated by the photovoltaic string to a voltage switch power (e.g., high voltage switch power) associated with driving the voltage switch. In certain embodiments, the device may include a discharge circuit having a discharge switch and a discharge resistor. In certain embodiments, the discharge circuit may be configured to drive the discharge switch complementary to a status of the voltage switch to establish a discharge path between the positive terminal and the negative terminal of the rapid shutdown device. In certain embodiments, the discharge circuit may be configured to facilitate de-energizing of a charge at an output of an inverter coupled to the rapid shutdown device. In certain embodiments, the device may also include an electronics housing installed on the roof of the structure. In certain embodiments, the electronics housing may house the rapid shutdown device that is in electrical communication between the photovoltaic string and the electrical connection to the grid power supply.

In certain embodiments, a method for utilizing a rapid shutdown device is provided. In certain embodiments, the method may include receiving, by a system including a rapid shutdown device comprising a first power line and a second power line, an electronic photovoltaic string status signal that indicates an operating status of a photovoltaic string comprising a plurality of photovoltaic modules, wherein the photovoltaic string is installed on a roof of a structure. Additionally, in certain embodiments, the method may include determining, based on the electronic photovoltaic string status signal and by utilizing the system including the rapid shutdown device, that the operating status of the photovoltaic string indicates presence of a hazard. Further, in certain embodiments, the method may include generating, based on the operating status of the photovoltaic string indicating the presence of the hazard, a voltage switch command signal configured to cause a voltage switch on the first power line of the rapid shutdown device to open, thereby disconnecting the photovoltaic string from an electrical connection to a grid power supply.

BRIEF DESCRIPTION OF THE DRAWINGS

FIG. 6 through 7B illustrate embodiments of wireways configured to receive and house componentry of a rapid shutdown device according to embodiments of the present disclosure.

DETAILED DESCRIPTION

Figures 1A, 1B, 1C, 1D:
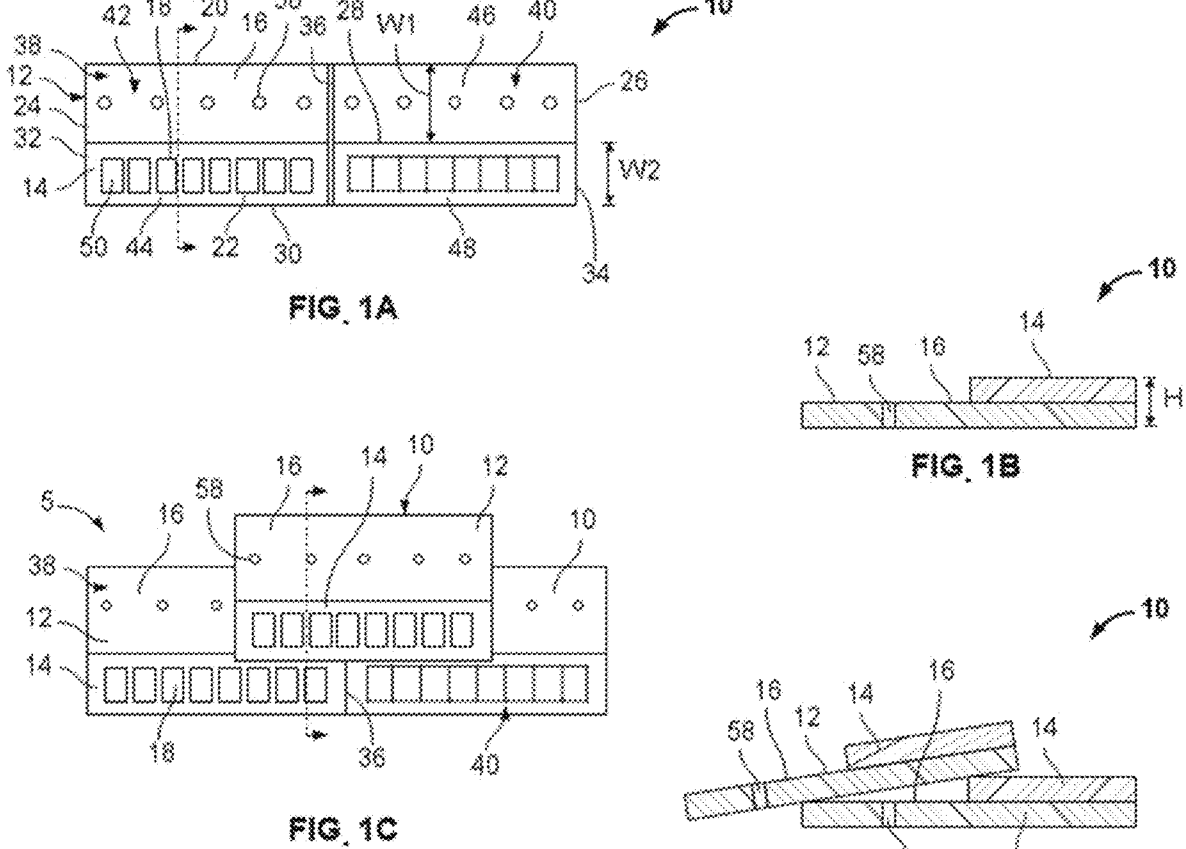
FIGS. 1A through 1D illustrate various views of a photovoltaic shingle and system of photovoltaic shingles for use with a rapid shutdown device according to embodiments of the present disclosure.

Rapid shutdown devices, rapid shutdown device systems, and accompanying methods for utilizing rapid shutdown devices and systems are disclosed herein. The US National Electric Code (NEC) has required photovoltaic modules and systems to incorporate the capability to quickly de-energize any while installed on a residential roof to make it safer for firefighters or other service personnel to interact in the event of an emergency. Initially, the NEC required array-level shutdown capabilities, however, the NEC has progressed to require module-level shutdown. Recent updates, for example, have effectively required a rapid shutdown device to be installed every 80V in a photovoltaic string of photovoltaic modules, which adds one extra electrical device for every photovoltaic module. Newer standards offer a physics-based approach to electrical safety instead of the previous 80V for every module approach. In certain embodiments, for example, the rapid shutdown devices and systems described herein enable the use of a rapid shutdown device at voltages higher than 30V and up to 600V. Additionally, the rapid shutdown device form-factor may be designed to meet the requirements for building-integrated photovoltaic systems. In certain embodiments, power line communication may be employed in combination with rapid shutdown devices for ease of installation and compatibility with various types of inverters utilized with photovoltaic modules and systems.

In certain embodiments, an exemplary rapid shutdown system is provided. In certain embodiments, the system may include a photovoltaic string that includes a plurality of photovoltaic modules. In certain embodiments, the photovoltaic string may be installed on a roof of a structure and one or more of the photovoltaic modules of the plurality of photovoltaic modules may include a first layer on a roof deck of the roof and a second layer having at least one photovoltaic cell. In certain embodiments, the second layer may be opposite to the roof deck. In certain embodiments, the system may include at least one electrical connection to a grid power supply associated with and/or providing power for the structure. In certain embodiments, the system may include at least one electronics housing installed on the roof of the structure, wherein the at least one electronics housing houses a rapid shutdown device in electrical communication between the photovoltaic string and the at least one electrical connection to the grid power supply. In certain embodiments, the rapid shutdown device includes a first power line and a second power line connected to the photovoltaic string and a high voltage switch on the first power line. In certain embodiments, the power lines may be structures used for electric power transmission between devices and/or componentry connected thereto. In certain embodiments, the power lines may be cables, wires, or other componentry including conductive material to facilitate the transfer and movement of electrical energy. In certain embodiments, the power lines may be covered by a non-conductive material, such as, but not limited to, plastic, rubber, and fluoropolymers, or any combination thereof. In certain embodiments, the voltage switch may be a solid state device that is configured to block positive voltage. In certain embodiments, for an ideal switch, the voltage may be zero and the current may flow through the circuit in either direction. In certain embodiments, the voltage switch may operate in two quadrants out of four of current-voltage ("i-v") space. In certain embodiments, the voltage switches utilized in circuits described herein may include, but are not limited to, insulated-gate bipolar transistor ("IGBT")-based switches, meta-oxide-semiconductor field-effect transistor ("MOSFET")-based switches, other switches, or a combination thereof. In certain embodiments, the voltage switches (e.g., IGBT, MOSFET, etc.) may include silicon, silicon carbide, gallium nitride (GaN), other types of materials, or a combination thereof. In certain embodiments, the voltage switch may be a high voltage switch. In certain embodiments, the high voltage switch may be configured to disconnect the first power line while the high voltage switch is open. In certain embodiments, the high voltage switch may be configured to have a blocking voltage exceeding a string voltage that may be associated with power generated by the photovoltaic string. In certain embodiments, the blocking voltage may be a maximum voltage that the high voltage switch is capable of handling before causing damage to the switch. In certain embodiments, the rapid shutdown system may include a gate drive circuit configured to receive at least one electronic photovoltaic string status signal indicative of an operating status of the photovoltaic string, determine that the operating status of the photovoltaic string indicates a hazard based at least in part on the at least one electronic photovoltaic string status signal, and generate, based on the operating status of the photovoltaic string indicating the hazard, a high voltage switch command signal configured to cause the high voltage switch to open so as to disconnect the photovoltaic string from the at least one electrical connection to the grid power supply with the blocking voltage exceeding the string voltage.

In certain embodiments, a rapid shutdown device of the rapid shutdown device system may include an internal power supply configured to convert the string voltage for a photovoltaic string of photovoltaic string modules to a lower voltage needed for operation of the rapid shutdown device.

Figure 19:
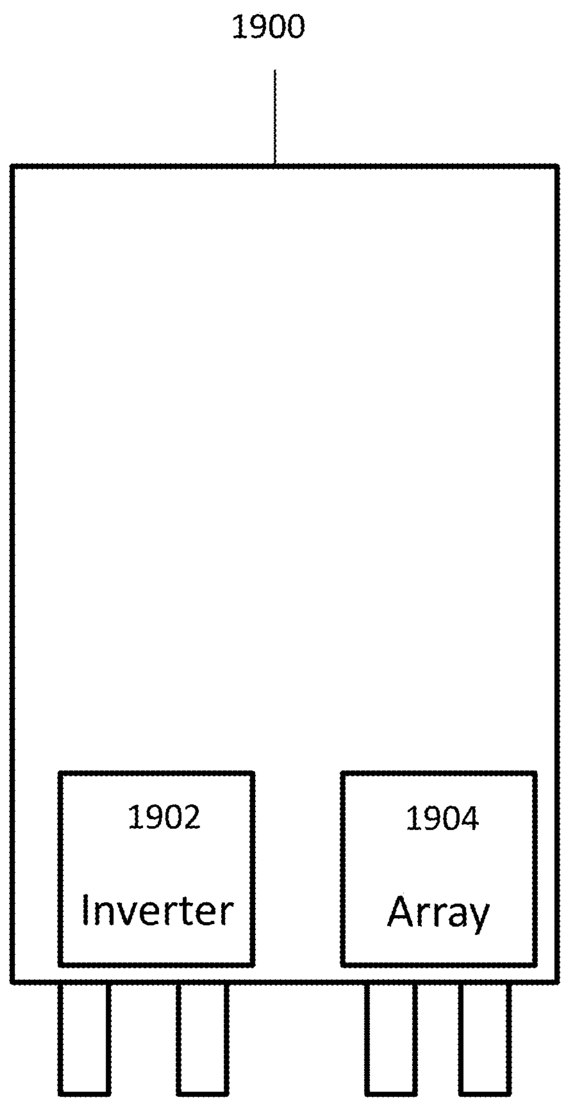
FIG. 19 illustrates an exemplary flat-design rapid shutdown device according to embodiments of the present disclosure.

For example, the internal power supply of the rapid shutdown device may receive 30V to 600V and convert it to 12V. In certain embodiments, the input range may be further narrowed down to 60V, 80V or any voltage higher than 30V and lower than 600V. In certain embodiments, the output voltage of the internal power supply of the rapid shutdown device may range from 1V to 24V or higher, depending on the implementation of the rapid shutdown device components. In certain embodiments, multiple power supplies may be implemented for different sub-circuits of the rapid shutdown device. In certain embodiments, the rapid shutdown device may be configured to handle string voltages as high as 1000V and above. In certain embodiments, the rapid shutdown device may include sub-circuits, such as a receiver circuit and a power circuit, as shown in FIG. 19.

In certain embodiments, the receiver circuit may serve as the receiving end of the communication protocol between the rapid shutdown device and an inverter, which receives a stay-on or shutdown command and enables the photovoltaic string to generate power or stop generating power accordingly. In certain embodiments, the communication for the rapid shutdown device may be implemented through a hard wire and utilize protocols such as serial, controller area network ("CAN"), other protocols, custom logic codes, or analog voltage levels. In certain embodiments, wireless communication may be implemented by utilizing technologies, such as WiFi, Zigbee, Z-Wave, and the like. In certain embodiments, PLC may be used so that the data may be modulated through the power cables/lines connecting the inverter to the photovoltaic string. In embodiments utilizing the PLC for communication, that rapid shutdown device may include a filter to extract the signal sent through the power line connected to the rapid shutdown device and photovoltaic string. In certain embodiments, the rapid shutdown device may include a demodulator circuit that translates the PLC signal to a status command, which determines the configuration of the power circuit. In certain embodiments, a communication circuit may be also implemented for the rapid shutdown device by a bidirectional receiver/transmitter method. In this case, in addition to the primary function of the rapid shutdown device receiver circuit, other information may be transmitted back to the inverter, a user of the rapid shutdown device, or other devices.

In certain embodiments, the power circuit of the rapid shutdown device may include switching devices (e.g., voltage switches) such as relays or solid-state switches, including, but not limited to, metal-oxide-semiconductor field-effect transistors "(MOSFET"), insulated-gate bipolar transistors ("IGBT"), thyristors, or any combination thereof. In certain embodiments, solid-state devices may be utilized to further extend the life-cycle of the rapid shutdown device and enable smaller form-factors for the rapid shutdown device. In certain embodiments, the switches of the power circuit of the rapid shutdown device may be configured according to a status signal. In certain embodiments, an exemplary configuration of the power circuit includes two switches (e.g., switch 1720 (S2) and switch 1721 (S3) in FIG. 17). In certain embodiments, when the switches are open, the photovoltaic string may be disconnected from the inverter. When the switches are closed, the photovoltaic string may be energized and connected to the inverter. In certain embodiments, instead of using two switches (i.e. a dipole configuration), only one switch may be employed in the rapid shutdown device power circuit (i.e., a monopole configuration). For example, either one of switches 1820 or 1821 may remain in the circuit and the other switch may be replaced with a conductive connection.

In certain embodiments, the rapid shutdown device may also include a switch and discharge resistor (e.g., switch 1712 (S1) and resistor 1710 (R1)) to de-energize any charge at the output of the inverter. In this case, discharge circuit switch may be closed when either or both of the switches of the power circuit are open, and the discharge circuit switch may be closed when power circuit switches are open. As a result, in certain embodiments, the status of the discharge circuit switch of the rapid shutdown device may be complementary to the status of the power circuit switches of the rapid shutdown device. In certain embodiments, the discharge circuit may be transformed to the inverter and not implemented within the rapid shutdown device.

In certain embodiments, there may be a power supply for powering both receiver and power circuits of the rapid shutdown device or separate power supplies may be utilized for the receiver and power circuits, with a separate power supply dedicated to each circuitry. In certain embodiments, the receiver circuit may be configured to output a command to the power circuit.

In certain embodiments, the command may be changed by the rapid shutdown device according to the state of operation through a gate drive circuit.

Figure 20:
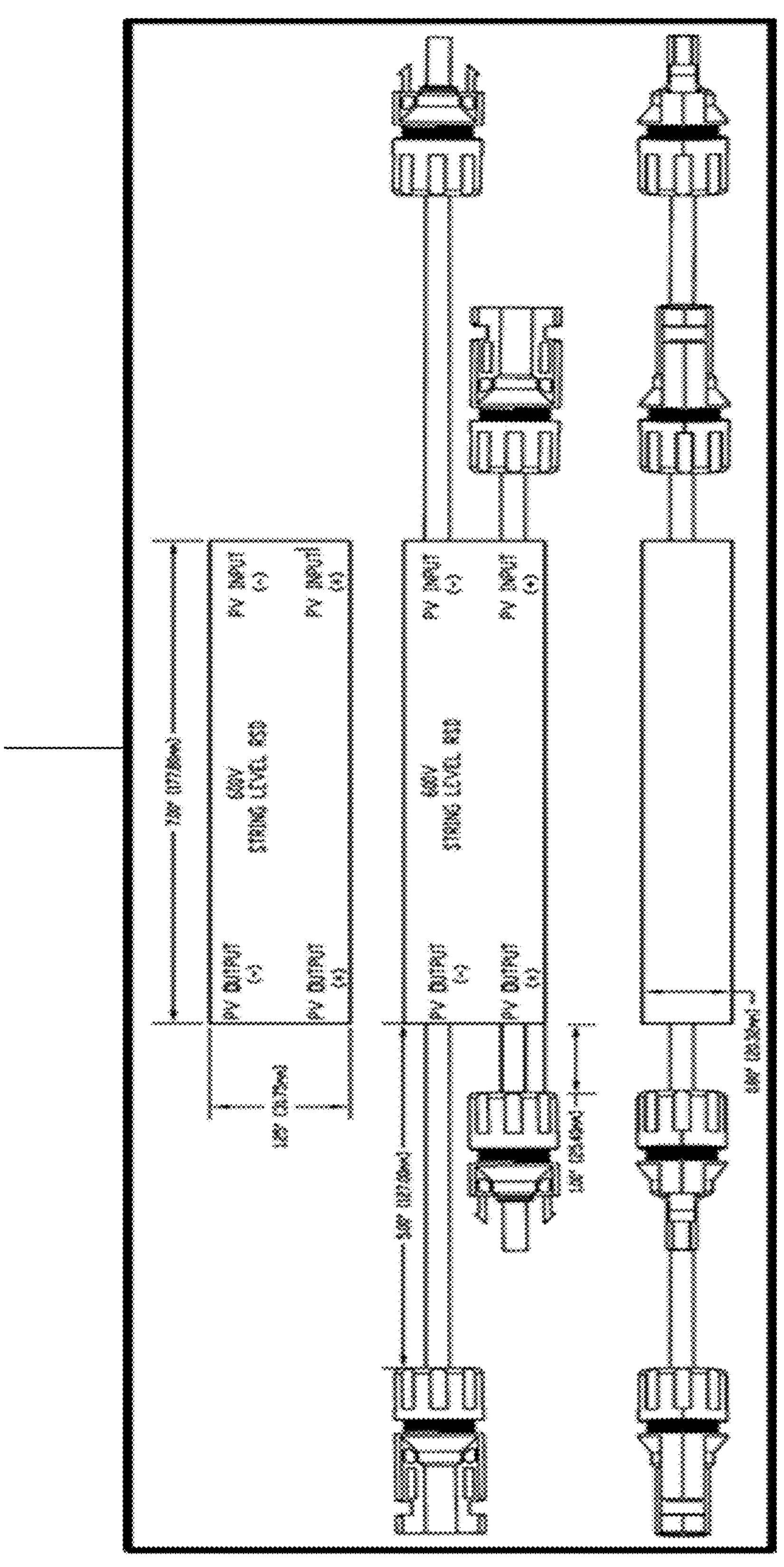
FIG. 20 illustrates an exemplary slim-design rapid shutdown device according to embodiments of the present disclosure.

In certain embodiments, the form-factor of the rapid shutdown device may be designed to match the functionality and aesthetics of a building-integrated photovoltaic system, in-roof solar system, or a combination thereof. An exemplary form-factor for the rapid shutdown device may be a flat design where the thickness of the device is substantially lower than the length and width of the rapid shutdown device, as shown in FIG. 19. In certain embodiments, the form-factor of the rapid shutdown device may be optimized for a transition box or any enclosure that is mounted on the roof, in an enclosure in the attic, on the wall adjacent to the photovoltaic string, or any combination thereof. Another exemplary form-factor for the rapid shutdown device may be a slim design where the length of the rapid shutdown device is longer than the width and length of the rapid shutdown device, as shown in FIG. 20. Such a design may be intended to fit in the wire-channels, wireways, wire ducts, or any combination thereof.

In certain embodiments, the electrical ratings of the rapid shutdown device may be configured to accommodate the photovoltaic string connected to the rapid shutdown device. In certain embodiments, the input current rating may be determined by the photovoltaic module and substring configurations. In certain embodiments, 6 A to 10 A ratings may accommodate modules with half-cut cells in series. In certain embodiments, 12 A to 20 A may accommodate a single string of full cell modules in series or two substrings of half cut cells in parallel.

In certain embodiments, the photovoltaic string includes photovoltaic modules with low leakage current below 2 mA, which is hazard level 0. In certain embodiments, the photovoltaic string of photovoltaic modules is gathered through interconnections (e.g., series and parallel) in a manner that the overall voltage remains below 1000V. In certain embodiments, the photovoltaic modules may not have any metal frames and all the components may be insulated such that no metal part is exposed, and no ground wiring is run through the photovoltaic string of modules. In certain embodiments, the photovoltaic modules may be directly attached to the surface below using fasteners (e.g., such as via nails, screws, and other fastening mechanisms) such that the fasteners are covered by other non-conductive modules or roofing materials. In certain embodiments, surface underneath may not be metal, but may be a wooden deck, or other roofing material such as underlayments or shingles.

In certain embodiments, the photovoltaic string of photovoltaic modules is connected to a rapid shutdown device, such as via a power line or wires. In certain embodiments, the rapid shutdown device may include one or more disconnecting switches, a circuits or other componentry to send stay on and/or turn off commands, as well as an enclosure (e.g., a housing) to be installed within a certain distance (e.g., 1 foot) of the string secured to the roof (e.g., 3 feet if the enclosure is installed in the attic). In certain embodiments, the disconnect switch may be implemented by utilizing electromechanical or solid-state relays or solid-state power electronics switches such as Power MOSFETs, IGBTs, thyristors, and IGCTs. In certain embodiments, the communication circuit may include hard-wired circuitry, such as those used for lighting applications. In certain embodiments, single, two, three or four-wire communication buses may be utilized. In certain embodiments, wireless communication technologies, such as Wi-Fi and Zigbee may also be utilized with the rapid shutdown device. In certain embodiments, the power line communication may be utilized with the rapid shutdown device, which may use photovoltaic wires that interconnect a grid-connected inverter to the photovoltaic string. As indicated above, the rapid shutdown system may also include a DC/AC inverter. In certain embodiments, the system may not require any specific inverter and may operate with any string as long as the proper transmitter is installed in the system to send the required signals to the rapid shutdown device of the system.

In certain embodiments, a configuration of the rapid shutdown system may encompass a configuration where the rapid shutdown device includes only one solid-state switch placed either at the beginning or end of the photovoltaic string. In certain embodiments, the switch may require a blocking voltage exceeding the string voltage for the photovoltaic string (e.g., the cumulative voltage of the modules in the string). In certain embodiments, the blocking voltage may be greater than or equal to 600V. In certain embodiments, the blocking voltage may be greater than 5% more than the string voltage, 10% more than the string voltage, or any percentage more than the string voltage. In certain embodiments, the current-carrying capacity may be greater than the photovoltaic string current. Moreover, the conductive losses may be dominant in the system. In certain embodiments, the allowable temperature rise may be determined by the difference between local ambient temperature and the maximum temperature allowed by adjacent material. GAF Energy has determined the local ambient temperature by running MST 21 testing for the product including the enclosure on the roof. The roof mounted enclosures and wire covers are introduced through other invention disclosures including transition box and roof attach components. In certain embodiments, roof-mounted enclosures and wire covers utilized with the rapid shutdown system may comprise non-metallic material. In certain embodiments, the wire insulation may be one of the limiting factors for temperature rise.

In certain embodiments, the disconnect switch may include a power supply for a gate drive circuit of the rapid shutdown device. In certain embodiments different switches may be driven at specific supply voltages ranging from 5V to above 20V. In certain embodiments, the photovoltaic string of photovoltaic modules may be directly connected to the rapid shutdown device and/or rapid shutdown device system. In certain embodiments, the photovoltaic string voltage may vary depending on the number of photovoltaic modules in the string and the configuration. For example, the voltage may vary from 50V to 600V. In certain embodiments, the power supply gate-drive circuit may reduce the voltage from this range to the required voltage for the gate drive circuit of the rapid shutdown device. In certain embodiments, different technologies for the power supply of the rapid shutdown device may include, but are not limited to, an isolated power supply with high frequency transformer, multi-stage, non-isolated DC-DC converters, charge pump circuits, or bootstrap circuits.

In certain embodiments, the command for controlling the switch may come through the communication circuit. Specifically, in certain embodiments, PLC serves an attractive technology because it does not require any additional wiring. In certain embodiments, the PLC componentry may utilize a receiver circuit including a filter and demodulator circuit. In certain embodiments, the circuitry may utilize a power supply ranging from 8V to 20V. In certain embodiments, power can be provided by a separated power supply or a similar power supply to the gate drive circuit if the voltages match. In certain embodiments, the receiver integrated circuit may be configured to demodulate the PLC communication and generates a command for the rapid shutdown device to either stay closed (on) or to be disconnected (off). In certain embodiments, after the rapid shutdown device is disconnected, the inverter voltage may be discharged either through the discharge circuit built-in to the inverter or a discharge circuit implemented in the rapid shutdown device itself. In certain embodiments, a way in which to implement the discharge circuit is to have a discharge switch that operates complementary with the rapid shutdown device switch. In certain embodiments, the discharge switch may establish a discharge path between the positive and negative terminals of the rapid shutdown device at the inverter side.

The rapid shutdown devices and systems according to the present disclosure provide a plurality of enhancements and optimizations to rapid shutdown technologies. For example, embodiments of the rapid shutdown devices and systems may utilize a monopole (i.e., a single switch on a single power line) to disconnect the photovoltaic string from a grid supply upon detection of a hazard. In certain embodiments, the photovoltaic modules utilized in the photovoltaic string may be low leakage current even damaged due to the structure and due to not having a metal frame or being grounded. In certain embodiments, there is no exposed metal in the rapid shutdown system and no grounding is required. In certain embodiments, the rapid shutdown devices are designed to fit the enclosures, such as those used for building-integrated photovoltaic systems.

Referring now also to FIGS. 1-13, exemplary photovoltaic shingles, modules, and roofing systems that may be utilized with the rapid shutdown devices of the present disclosure are schematically illustrated. More specifically referring to FIGS. 1A through 2D, in certain embodiments, a roofing system 5 includes a plurality of photovoltaic shingles 10, each of which includes a first layer 12 and a second layer 14 overlaying the first layer 12. In certain embodiments, the first layer 12 and the second layer 14 may have direct contact with each other and the second layer 14 may be laid on top of at least a portion of the first layer 12. In certain embodiments, the first layer 12 includes a head lap 16. In certain embodiments, the second layer 14 includes at least one solar cell 18. In certain embodiments, the at least one solar cell 18 includes a plurality of the solar cells 18. In certain embodiments, at least one of the plurality of photovoltaic shingles 10 overlays at least the head lap 16 of another of the plurality of photovoltaic shingles 10. Still referring to FIGS. 1A through 2D, in certain embodiments, the first layer 12 includes a first end 20, a second end 22 opposite the first end 20, a third end 24 extending from the first end 20 of to the second end 22, and a fourth end 26 opposite the third end 24 and extending from the first end 20 to the second end 22. In certain embodiments, the head lap 16 extends from the third end 24 to the fourth end 26. In certain embodiments, the second layer 14 extends from the third end 24 of the first layer 12 to the fourth end 26 of the first layer 12. In certain embodiments, the second layer 14 extends intermediate the third and fourth ends 24, 26 of the first layer 12. In certain embodiments, the second layer 14 is located proximate to the second end 22 of the first layer 12.

In certain embodiments, the head lap 16 includes a first width W1 and the second layer 14 includes a second width W2. In certain embodiments, the first width W1 extends from the first end 20 of the first layer 12 to the first end 28 of the second layer 14. In certain embodiments, the second width W2 extends from the first end 28 of the second layer 14 to the second end 30 of the second layer 14. In certain embodiments, the first width W1 is greater than the second width W2. In certain embodiments, the second width W2 is greater than the first width W1. In certain embodiments, the first width W1 and the second width W2 are equal to one another.

Still referring to FIGS. 1A through 2D, in certain embodiments, each of the plurality of photovoltaic shingles 10 includes a fold line 36 extending from the first end 20 of the first layer 12 to the second end 22 of the first layer 12 and intermediate the third and fourth ends 24, 26 of the first layer 12. In certain embodiments, the fold line 36 extends from and through the first end 28 of the second layer 14 to the second end 30 of the second layer 14. In certain embodiments, the fold line 36 enables the photovoltaic shingle 10 to be folded in half for reduction of space in connection with the storage or transport of the photovoltaic shingle 10. In certain embodiments, each of the plurality of photovoltaic shingles 10 includes a first section 38 extending from the third end 24 of the first layer 12 to the fold line 36, and a second section 40 extending from the fourth end 26 of the first layer 12 to the fold line 36. In certain embodiments, the first section 38 includes a first portion 42 of the head lap 16 and a first portion 44 of the second layer 14, and the second section 40 includes a second portion 46 of the head lap 16 and a second portion 48 of the second layer 14. In certain embodiments, the at least one solar cell 18 includes a first one 50 of the at least one solar cell 18 located in the first portion 44 of the second layer 14 and a second one 52 of the at least one solar cell 18 located in the second portion 48 of the second layer 14. In certain embodiments, the first one 50 of the at least one solar cell 18 includes a first plurality of the solar cells 18, and the second one 52 of the at least one solar cell 18 includes a second plurality of the solar cells 18.

Figures 2A, 2B, 2C, 2D:
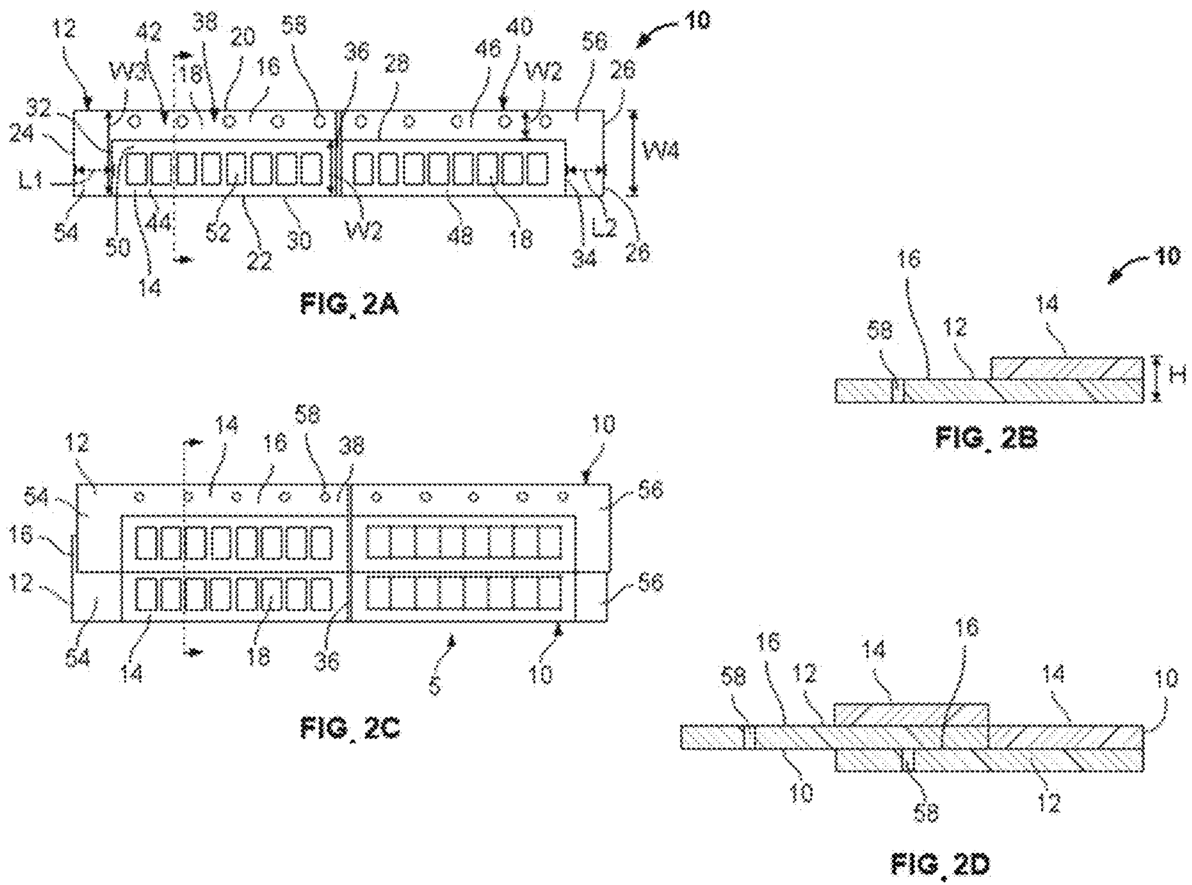
FIGS. 2A through 2E illustrate various views of a photovoltaic shingle and system of photovoltaic shingles for use with a rapid shutdown device according to embodiments of the present disclosure.

Referring to FIGS. 2A and 2C, in certain embodiments, the second layer 14 extends intermediate the third and fourth ends 24, 26 of the first layer 12. In certain embodiments, the first layer includes a first step flap 54 adjacent the third end 32 of the second layer 14 and a second step flap 56 adjacent the fourth end 34 of the second layer 14. In certain embodiments, the first step flap 54 includes a length L1 extending from the third end 32 of the second layer 14 to the third end 24 of the first layer 12. In certain embodiments, the first step flap 54 includes a width W3 extending from the first end 20 of the first layer 12 to the second end 22 of the first layer 12. In certain embodiments, the second step flap 56 includes a length L2 extending from the fourth end 34 of the second layer 14 to the fourth end 26 of the first layer 12. In certain embodiments, the second step flap 56 includes a width W4 extending from the first end 20 of the first layer 12 to the second end 22 of the first layer 12. In certain embodiments, the width W3 is equal to the width W4. In certain embodiments, the length L1 and is equal to the length L2. In certain embodiments, the head lap 16, the first step flap 54, and the second step flap 56 are contiguous. In certain embodiments, the second layer 14 extends from the third end 24 of the first layer 12 to a location intermediate the third and fourth ends 24, 26 of the first layer 12. In certain embodiments, the first layer 12 includes the second step flap 56 adjacent the fourth end 34 of the second layer 14. In certain embodiments, the head lap 16 and the second step flap 56 are contiguous.

In certain embodiments, the second layer 14 extends from the fourth end 26 of the first layer 12 to a location intermediate the third and fourth ends 24, 26 of the first layer 12. In certain embodiments, the first layer 12 includes the first step flap 54 adjacent the third end 32 of the second layer 14. In certain embodiments, the head lap 16 and the first step flap 54 are contiguous. In certain embodiments, each of the first layer 12 and the second layer 14 is composed of a polymer. In certain embodiments, each of the first layer 12 and the second layer 14 is composed of thermoplastic polyolefin (TPO). In certain embodiments, each of the first layer 12 and the second layer 14 is composed of polyethylene terephthalate (PET), polyethylene naphthalate (PEN), polyetheretherketone (PEEK), polyaryletherketone (PAEK), polyarylate (PAR), polyetherimide (PEI), polyarylsulfone (PAS), polyethersulfone (PES), polyamideimide (PAI), or polyimide; polyvinyl chloride (PVC); ethylene propylene diene monomer (EPDM) rubber; silicone rubber; fluoropolymers-ethylene tetrafluoroethylene (ETFE), polyvinylidene fluoride (PVDF), tetrafluoroethylene-hexafluoropropylene copolymers (FEP), and tetrafluoroethylene hexafluoropropylene-vinylidene fluoride copolymers (THV), or blends thereof. In certain embodiments, the first layer 12 and the second layer 14 are laminated. In certain embodiments, the second layer 14 is ultrasonically welded to the first layer 12. In certain embodiments, the second layer 14 is heat welded to the first layer 12. In certain embodiments, the second layer 14 is thermally bonded to the first layer 12. In certain embodiments, the plurality of photovoltaic shingles 10 is installed on a roof deck 200. In certain embodiments, the roof deck 200 may be made of wood or other non-conductive materials and may be the surface upon which photovoltaic shingles 10 are secured. In certain embodiments, the roof deck 200 may comprise roofing material that resides between the structural componentry of a roof (e.g. trusses, joists, and/or other structural componentry) and the waterproofing or other layers upon which shingles 10 may be placed. In certain embodiments, the plurality of photovoltaic shingles 10 is installed directly to the roof deck 200. In certain embodiments, each of the plurality of photovoltaic shingles 10 is installed on the roof deck 200 by a plurality of fasteners 58. In certain embodiments, the plurality of fasteners 58 are installed through the head lap 16. In certain embodiments, the plurality of fasteners 58 includes a plurality of nails.

Figure 2E:
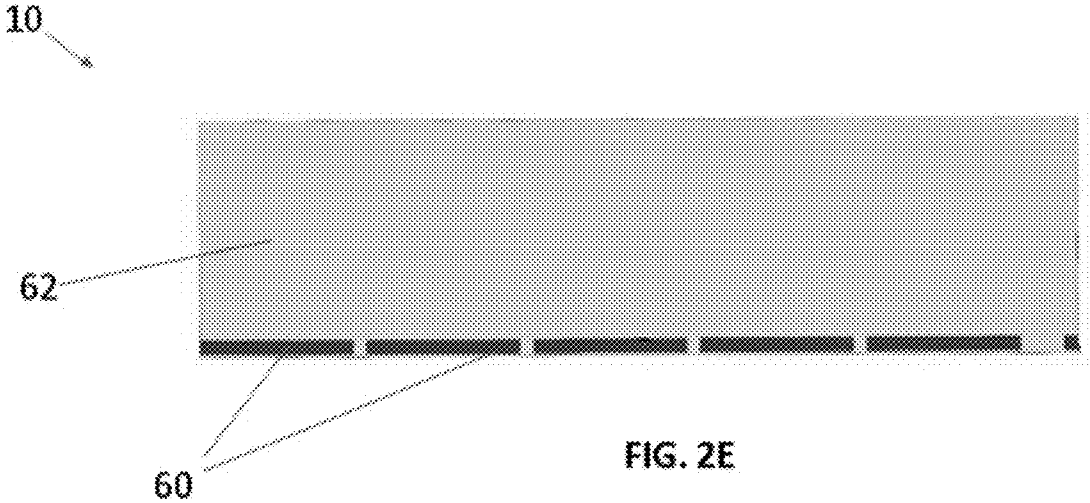
Figures 3A, 3B, 3C:
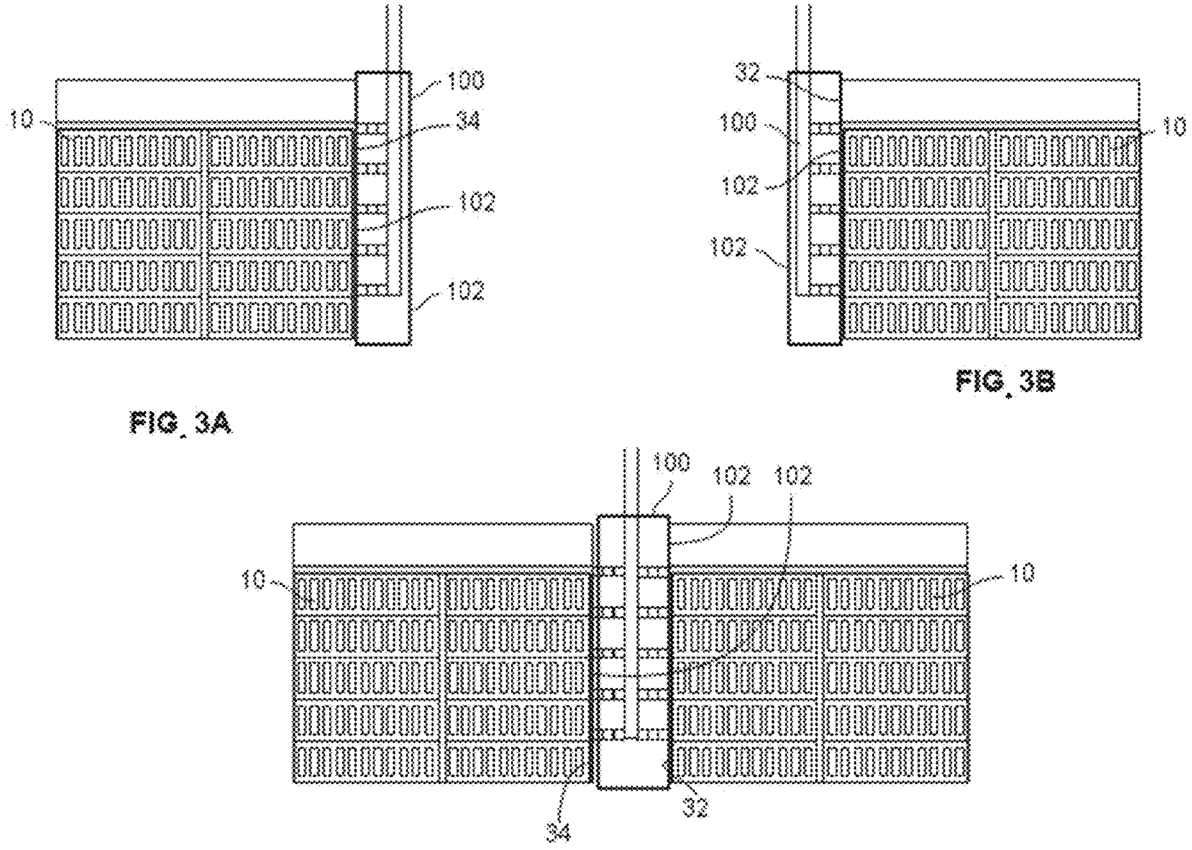
FIGS. 3A through 3E illustrate embodiments of photovoltaic shingles and associated wireways employed by the photovoltaic shingles according to embodiments of the present disclosure.
Figure 3D:
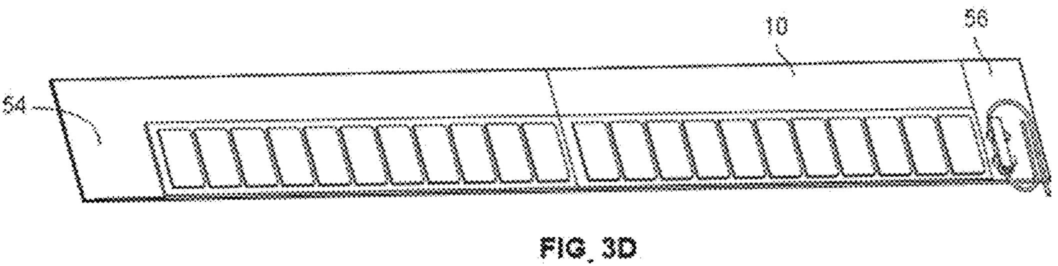
Figure 3E:
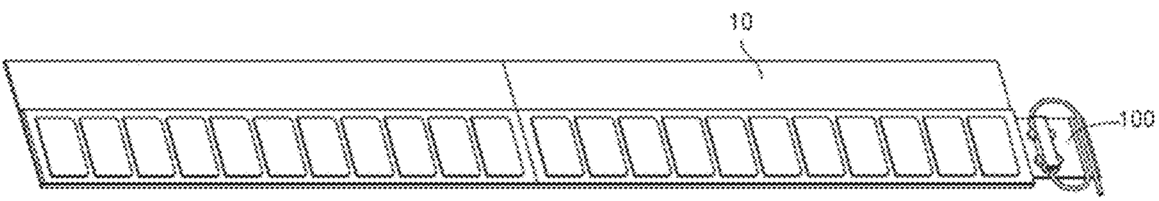
Figures 4, 5:
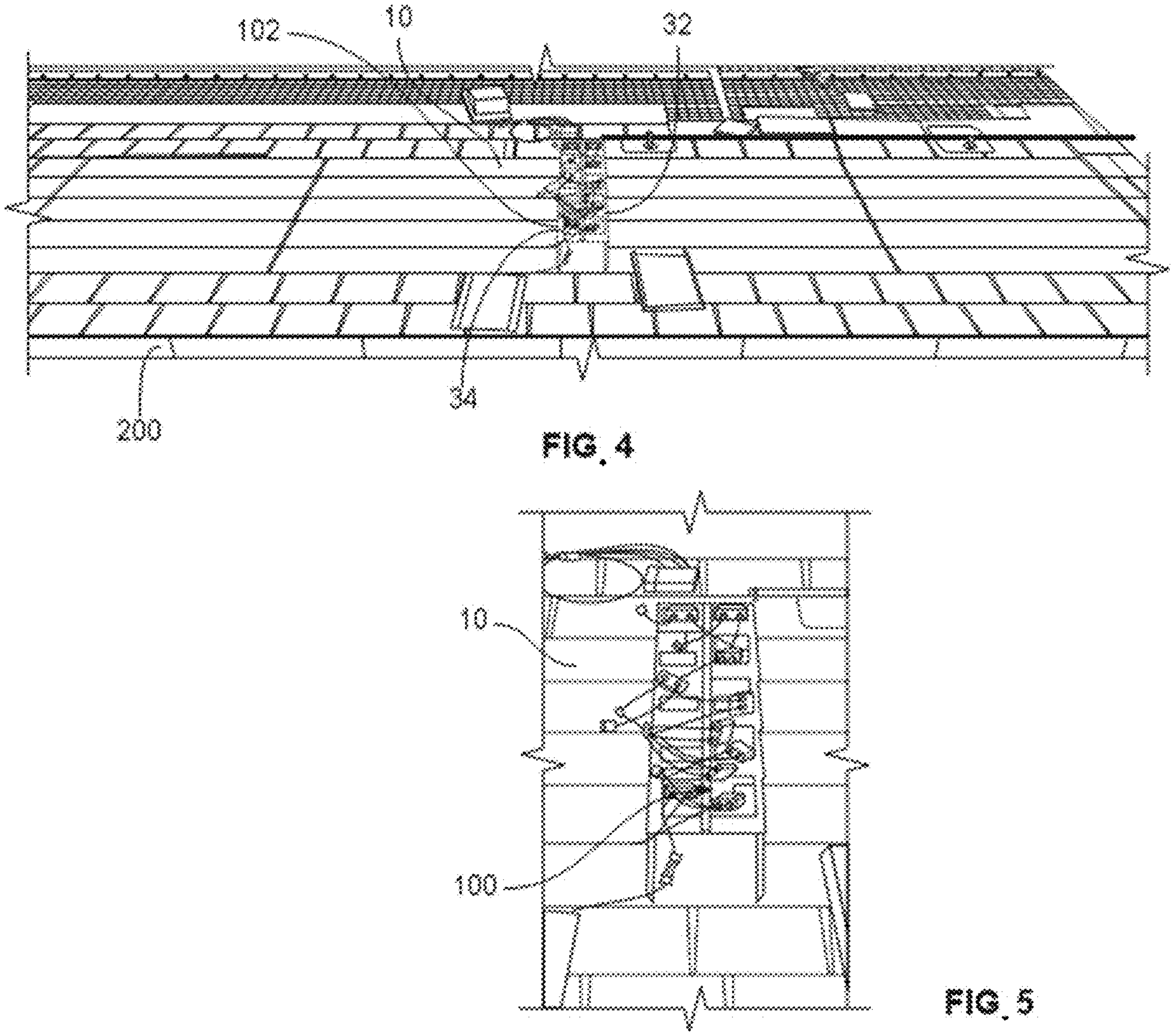
FIGS. 4 and 5 illustrate exemplary roofing systems including photovoltaic shingles and associated wireways that are configure to operate with rapid shutdown devices according to embodiments of the present disclosure.

Referring to FIG. 2E, in certain embodiments, each of the plurality of photovoltaic shingles 10 is installed on the roof deck 200 by an adhesive 60. In certain embodiments, the adhesive 60 is adhered directly to the roof deck 200. In certain embodiments, the adhesive 60 is adhered to an underlayment. In certain embodiments, the underlayment is adhered directly to the roof deck 200. In certain embodiments, the adhesive 60 is located on a rear surface 62 of the photovoltaic shingle 10. In certain embodiments, the adhesive 60 includes at least one adhesive strip. In certain embodiments, the adhesive 60 includes a plurality of adhesive strips. In certain embodiments, the plurality of adhesive strips is arranged intermittently. In certain embodiments, the adhesive 60 is located proximate to one edge of the photovoltaic shingle 10. In certain embodiments, the adhesive 60 is a peel and stick film sheet. In certain embodiments, the peel and stick film sheet includes at least one sheet of film removably attached to the rear surface 62. In certain embodiments, the peel and stick film sheet is composed of EverGuard Freedom HW peel and stick membrane manufactured by GAF. In certain embodiments, the adhesive 60 includes polyvinyl butyrate, acrylic, silicone, or polycarbonate. In certain embodiments, the adhesive 60 includes pressure sensitive adhesives.

Figures 6, 7A, 7B:
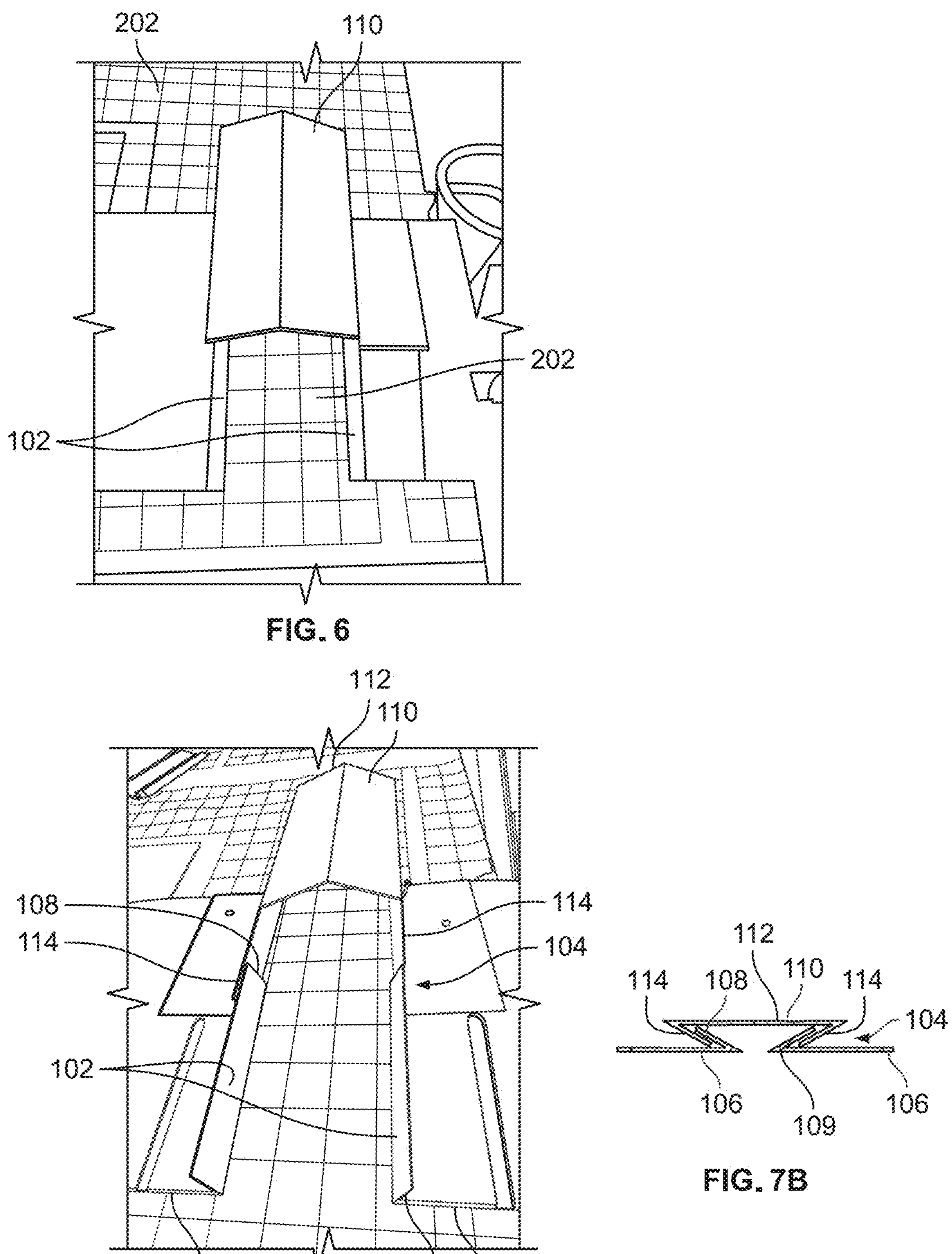
Figure 8:
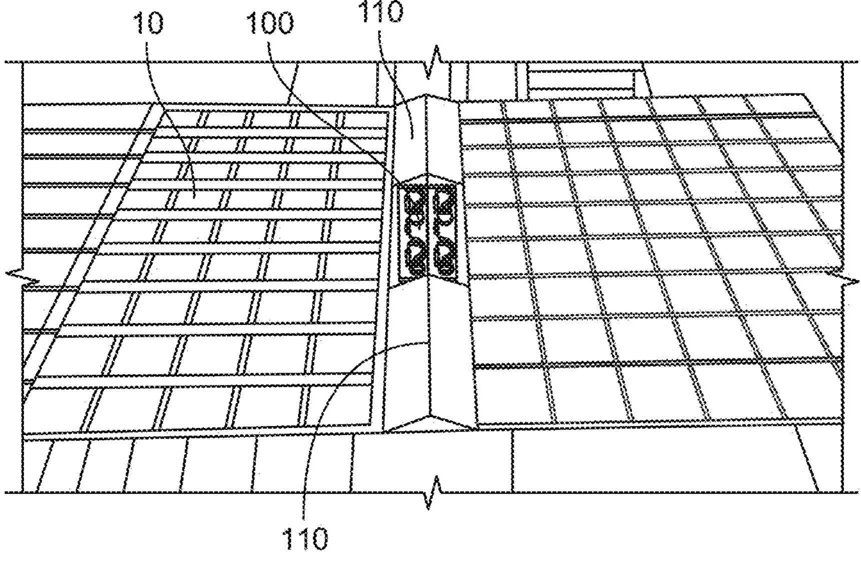
FIGS. 8 and 9 illustrate embodiments of photovoltaic singles including wireways and associated covers configured to receive and house componentry of a rapid shutdown device according to embodiments of the present disclosure.
Figure 9:
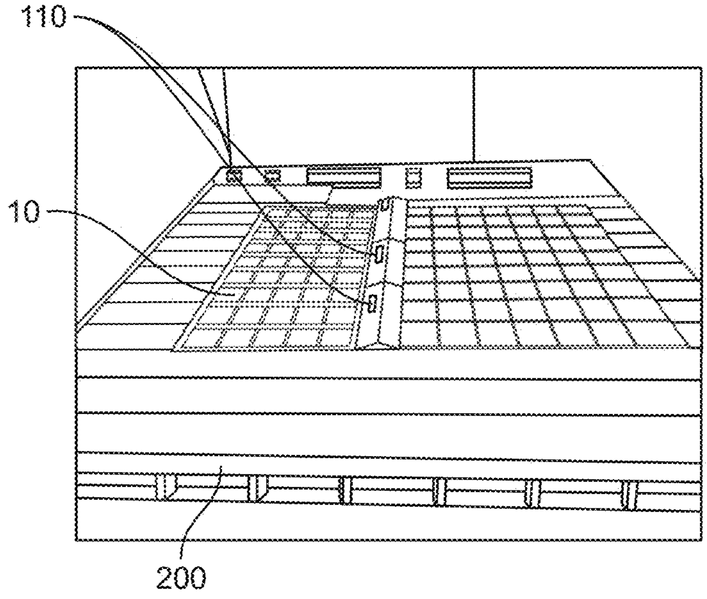
Figure 10:
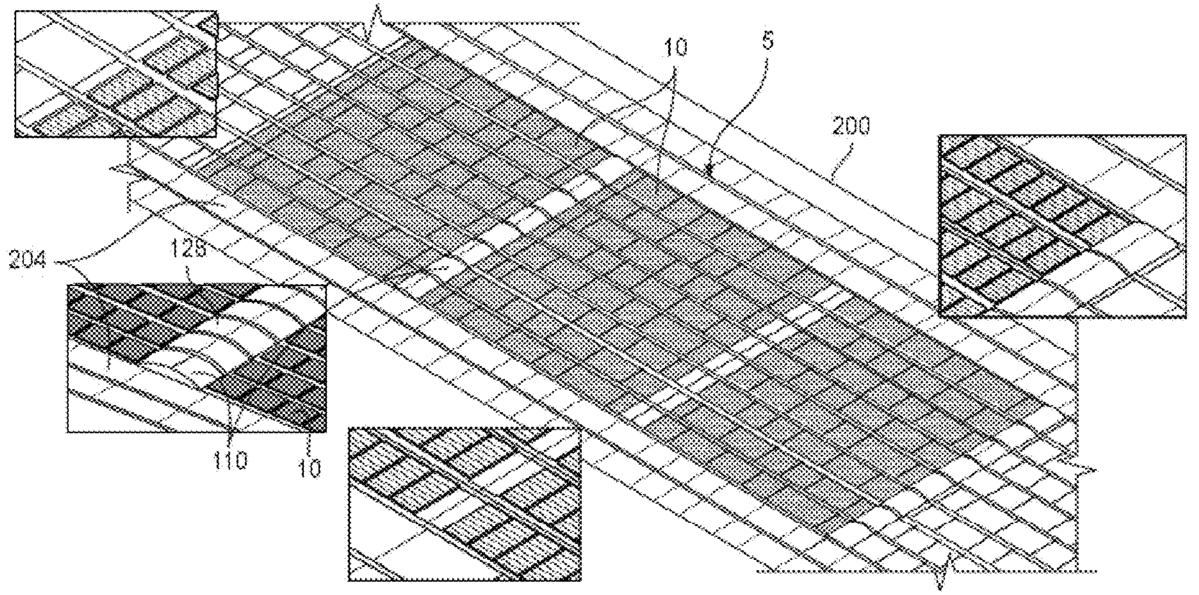
FIG. 10 illustrates a perspective view of embodiments of a roofing system with photovoltaic shingles and wireway covers according to embodiments of the present disclosure.

In certain embodiments, the system 5 includes an underlayment layer 202 installed on the roof deck 200 (see FIG. 6). In certain embodiments, the plurality of photovoltaic shingles 10 overlay the underlayment layer 202. Referring to FIGS. 1A through 1D, in certain embodiments, one of the plurality of photovoltaic shingles 10 overlays the head lap 16 of another of the plurality of photovoltaic shingles 10. In certain embodiments, one of the plurality of photovoltaic shingles 10 overlays the first section 38 and the second section 40 of the another of the of the plurality of photovoltaic shingles 10 for a staggered installation of the photovoltaic shingles 10. In certain embodiments, the first section 38 of the one of the plurality of photovoltaic shingles 10 overlays the first section 38 and the second section 40 of the another of the of the plurality of photovoltaic shingles 10. In certain embodiments, the second section 40 of the one of the plurality of photovoltaic shingles 10 overlays the first section 38 and the second section 40 of the another of the of the plurality of photovoltaic shingles 10.

Referring to FIGS. 2A through 2D, in certain embodiments, the first step flap 54 of one of the plurality of photovoltaic shingles 10 overlays the first step flap 54 of another of the plurality of photovoltaic shingles 10, and the second step flap 56 of the one of the plurality of photovoltaic shingles 10 overlays the second step flap 56 of the another of the plurality of photovoltaic shingles 10 for a non-staggered installation of the photovoltaic shingles 10. In certain embodiments, the first step flap 54 of the one of the plurality of photovoltaic shingles 10 substantially aligns with the first step flap 54 of the another of the plurality of photovoltaic shingles 10, and the second step flap 56 of the one of the plurality of photovoltaic shingles 10 substantially aligns with the second step flap 56 of the another of the plurality of photovoltaic shingles 10. In certain embodiments, the third end 32 of the second layer 14 of the one of the plurality of photovoltaic shingles 10 substantially aligns with the third end 32 of the second layer 14 of the another of the plurality of photovoltaic shingles 10, and the fourth end 34 of the second layer 14 of the one of the plurality of photovoltaic shingles 10 substantially aligns with the fourth end 34 of the second layer 14 of the another of the plurality of photovoltaic shingles 10. In certain embodiments, the second step flap 56 of one of the plurality of photovoltaic shingles 10 overlays the first step flap 54 of another of the plurality of photovoltaic shingles 10.

Referring to FIGS. 3A through 5, in certain embodiments, the system 5 includes at least one wireway 100 installed proximate to the plurality of photovoltaic shingles 10 on the roof deck 200. In certain embodiments, the at least one wireway 100 is installed intermediate the plurality of photovoltaic shingles 10. In certain embodiments, the at least one wireway 100 is installed proximate to each of the third ends 32 of the second layers 14. In certain embodiments, the at least one wireway 100 overlays each of the first step flaps 54. In certain embodiments, the at least one wireway 100 is installed proximate to each of the fourth ends 34 of the second layers 14. In certain embodiments, the at least one wireway 100 overlays each of the second step flaps 56. In certain embodiments, the at least one wireway 100 is installed intermediate each of the third ends 32 of a first plurality of the photovoltaic shingles 10 and the fourth ends 34 of a second plurality of the photovoltaic shingles 10. In certain embodiments, the at least one wireway 100 overlays each of the first step flaps 54. In certain embodiments, the at least one wireway 100 overlays each of the second step flaps 56. In certain embodiments, the step flaps 54, 56 form the wireway 100.

Referring to FIGS. 6 through 9, in certain embodiments, the at least one wireway 100 includes a pair of rails 102 spaced apart from one another. In certain embodiments, the rails 102 extend outwardly from the roof deck 200. In certain embodiments, the rails 102 are substantially parallel to another. In certain embodiments, each of the rails 102 includes side flashing 104. In certain embodiments, each of the side flashing 104 includes a first portion 106 positioned on the roof deck 200 and second portion 108 extending obliquely and inwardly in a first direction relative to the first portion 106. In certain embodiments, slots 109 are formed between the first portions 106 and the second portions 108. In certain embodiments, the at least one wireway 100 is rectangular in shape. In certain embodiments, the photovoltaic shingles 10 overlay the second portion 108 of the side flashing 104. In certain embodiments, the at least one wireway 100 is sized and shaped to receive electrical components of a photovoltaic system, such as an electrical junction box, electrical wire, and electrical connectors. Still referring to FIGS. 6 through 9, in certain embodiments, the at least one wireway 100 includes a lid 110. In certain embodiments, the lid 110 is removably attached to the at least one wireway 100. In certain embodiments, the lid 110 includes a cover portion 112 and a pair of rails 114 spaced apart from one another and extending obliquely and inwardly in a second direction opposite the first direction of the second portion 108 of the rails 102. In certain embodiments, the 10 lid 110 is removably engaged with the side flashing 104 of the wireway 100 such that the rails 114 of the lid 110 engage (e.g., snap-in) the second portions 108 of the side flashing 104. In certain embodiments, the lid 110 is substantially rectangular in shape. In certain embodiments, the rails 114 extend outwardly and obliquely in the first direction. In certain embodiments, the lid 110 is removably attached to the at least one wireway 100 by screws, nails, rivets, adhesives or other fasteners. In certain embodiments, bands 128 mimic the appearance of the photovoltaic shingles 10 to provide a blended aesthetic look between the lids 110, the photovoltaic shingles 10, and a plurality of roofing shingles 204 of the roofing system 5 (see FIG. 10).

Figure 11:
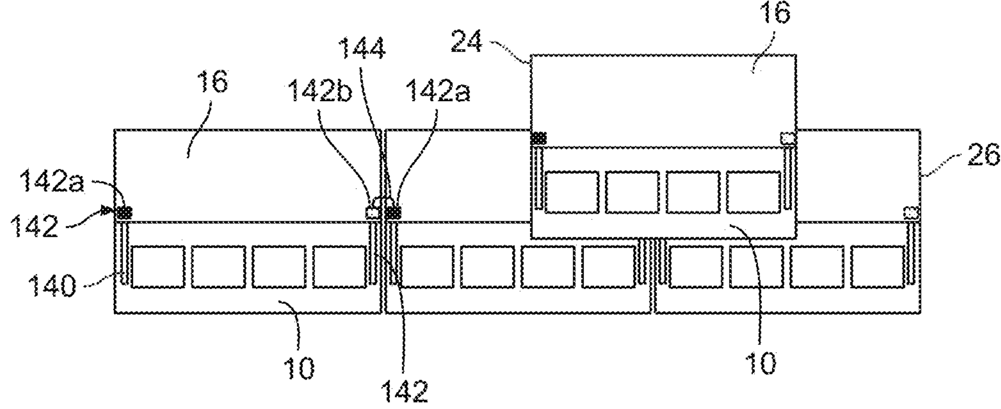
FIGS. 11 and 12 provide top plan and side cross-sectional views, respectively, of embodiments of a system of photovoltaic shingles including electrical connectors.
Figure 12:
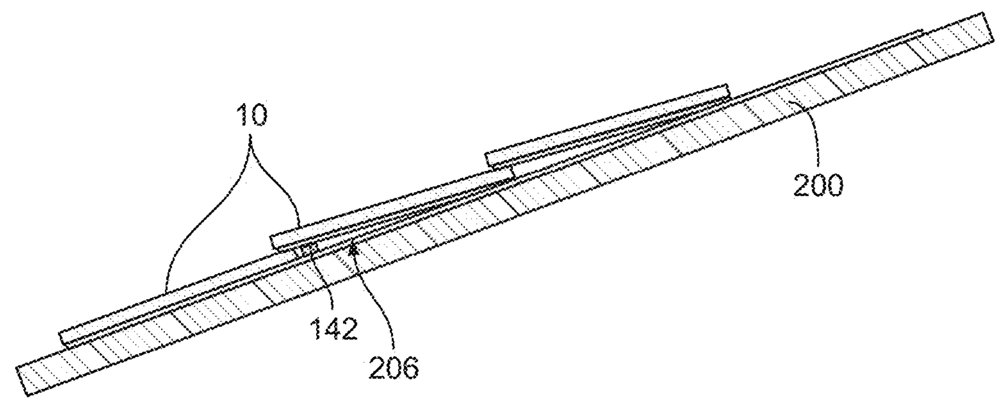

Referring to FIGS. 11 and 12, in certain embodiments, the at least one solar cell 18 includes an electrical bussing 140 and at least one electrical connector 142 electrically connected to the electrical bussing 140. In certain embodiments, the at least one electrical connector 142 is positioned on the head lap 16. In certain embodiments, the at least one electrical connector 142 includes a first electrical connector 142*a* and a second electrical connector 142*b*. In certain embodiments, the first electrical connector 142*a* is positioned proximate to the third end 24 and the second electrical connector 142*b* is positioned proximate to the fourth end 26.

In certain embodiments, the first electrical connector 142*a* of one of the plurality of photovoltaic shingles 10 is connected to the second electrical connector 142*b* of another of the plurality of photovoltaic shingles 10. In certain embodiments, the first electrical connector 142*a* is a plug connector and the second electrical connector 142*b* is a socket connector. In certain embodiments, the first and second electrical connectors 142*a*, 142*b* are connected to one another by an electrical wire 144 (see FIGS. 11 and 12). In certain embodiments, the first and second electrical connectors 142*a*, 142*b* are removably connected to one another.

Figures 13, 14:
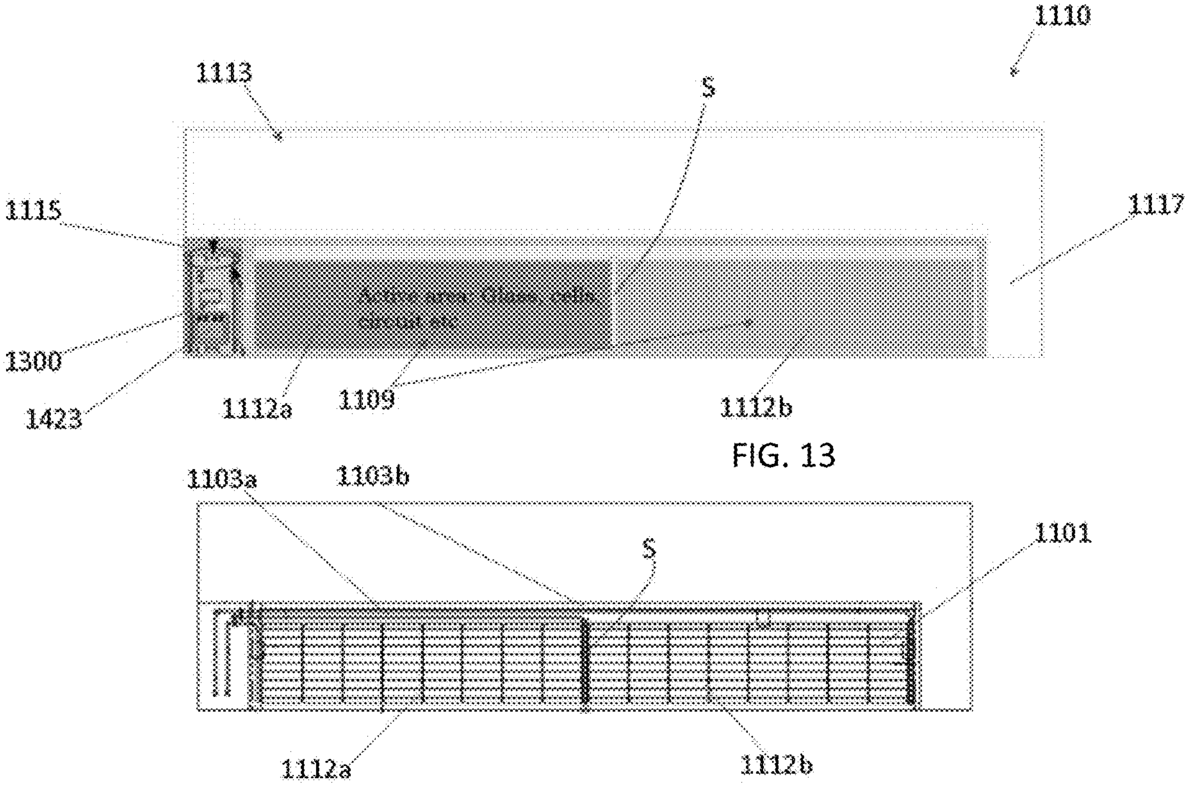
FIGS. 13 and 14 illustrate top plan views of embodiments of a photovoltaic module for use with a photovoltaic string configured to operate with a rapid shutdown device according to embodiments of the present disclosure.

Referring to FIGS. 13 and 14, in certain embodiments, a photovoltaic module 1110 includes an active area 1109 having a plurality of solar cells 1112. In certain embodiments, the photovoltaic module 1110 includes an inactive area comprising a headlap portion 1113, a first side lap 1115 located at one end of the photovoltaic module 1110, and a second side lap 1117 located at an opposite end of the photovoltaic module 1110. In certain embodiments, the headlap portion 1113 is textured. In certain embodiments, the texture of the headlap portion 1113 is different from a texture of the solar cells 1112. In certain embodiments, a wire cover bracket 1300 is attached to the first side lap 1115. In certain embodiments, the wire cover bracket 1300 includes a junction box 1423. Details of the wire cover bracket 1300 shall be provided hereinbelow. In certain embodiments, the plurality of solar cells 1112 includes a first set of solar cells 1112*a* and a second set of solar cells 1112*b*. In certain embodiments, the first set of solar cells 1112*a* includes eight of the solar cells 1112. In certain embodiments, the second set of solar cells 1112*b* includes eight of the solar cells 1112. In certain embodiments, each of the first set of solar cells 1112*a* and the second set of solar cells 1112*b* includes more or less than eight of the solar cells 1112. In certain embodiments, a last one of the solar cells 1112 of the first set of solar cells 1112*a* is separated by a first one of the solar cells 1112 of the second set of solar cells 1112*b* by a space S. In certain embodiments, the space S is located approximately half the length of the photovoltaic module 1110. In certain embodiments, the solar cells 1112 of each of the first and second sets of solar cells 1112*a*, 1112*b* are strung together with bussing 1101. In certain embodiments, the bussing 1101 includes nine bussing wires. In certain embodiments, the bussing 1101 may include more or less than the nine bussing wires. In certain embodiments, a first bussing wire 1103*a* extends from the first side lap 1115 to the space S. In certain embodiments, the first bussing wire 1103*a* extends to approximately half the length of the photovoltaic module 1110. In certain embodiments, one end of the first bussing wire 1103*a* is electrically connected to the junction box 1423 and the other end of the first bussing wire 1103*a* is electrically connected to the first set of solar cells 1112*a*. In certain embodiments, a second bussing wire 1103*b* extends from the first side lap 1115 to a location proximate to the second side lap 1117. In certain embodiments, the second bussing wire 1103*b* extends substantially the entire length of the photovoltaic module 1110. In certain embodiments, one end of the second bussing wire 1103*b* is electrically connected to the junction box 1423 and the other end of the second bussing wire 1103*b* is electrically connected to the second set of solar cells 1112*b*. In certain embodiments, each of the first bussing wire 1103*a* and the second bussing wire 1103*b* is covered with a polymer layer. In certain embodiments, each of the first bussing wire 1103*a* and the second bussing wire 1103*b* is covered with expanded polyethylene ("EPE"). In certain embodiments, the EPE is comprised of a black strip. In certain embodiments, each of the first bussing wire 1103*a* and the second bussing wire 1103*b* is coated with a colorant or dye to reduce reflectivity. In certain embodiments, the plurality of solar cells 1112 includes a plurality of the solar cells 1112. In certain embodiments, the plurality of solar cells 1112 is arranged in one row (i.e., one reveal). In certain embodiments, the plurality of solar cells 1112 is arranged in two rows (i.e., two reveals). In certain embodiments, the plurality of solar cells 1112 is arranged in three rows (i.e., three reveals). In certain embodiments, the plurality of solar cells 1112 is arranged in four rows (i.e., four reveals). In certain embodiments, the plurality of solar cells 1112 is arranged in five rows (i.e., five reveals). In certain embodiments, the plurality of solar cells 1112 is arranged in six rows (i.e., six reveals). In certain embodiments, the plurality of solar cells 1112 is arranged in more than six rows.

Figure 15:
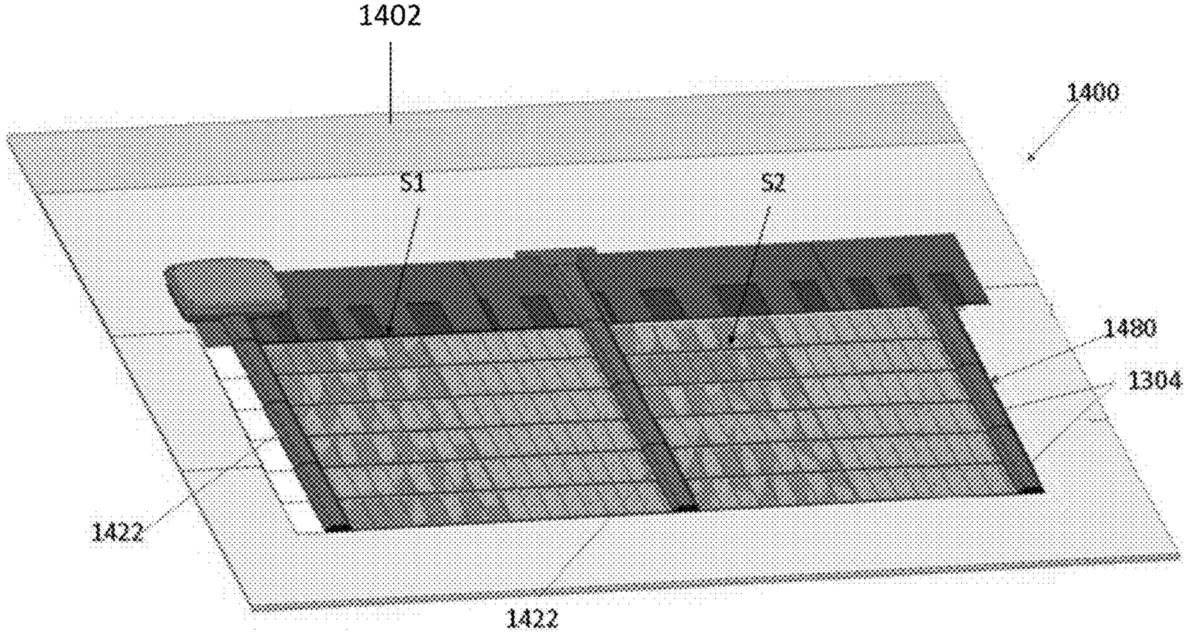
FIG. 15 illustrates a top perspective view of embodiments of a building integrated photovoltaic system installed on a roof deck and configured to operate with a rapid shutdown device

Referring to FIG. 15, in certain embodiments, the photovoltaic system 1400 is installed on the roof deck 1402. In certain embodiments, an additional, non-active (i.e., "dummy") wireway 1480 and associated cover 1304, similar to the at least one wireway 1422 and the associated covers 1304, may be installed on the end of the second subarray S2 for symmetry and aesthetics. In certain embodiments, the non-active wireway 1480 is installed over the second side laps 1117 of the photovoltaic modules 1110*b*. In certain embodiments, the non-active wireway 1480 does not include any electrical components or electrical wiring. In certain embodiments, the non-active wireway 1480 is optional and need not be included. In certain embodiments, roofing shingles overlay the second side laps 1117 of the photovoltaic modules 1110*b* of the second subarray S2.

In certain embodiments, it should be understood that the non-active wireway 1480 or roofing shingles may overlay the second side laps 1117 of the photovoltaic modules 1110*a* of the first subarray S1 in the absence of the second subarray S2.

Figure 16:
FIG. 16 illustrates a rapid shutdown device and system according to embodiments of the present disclosure.
Figure 16:
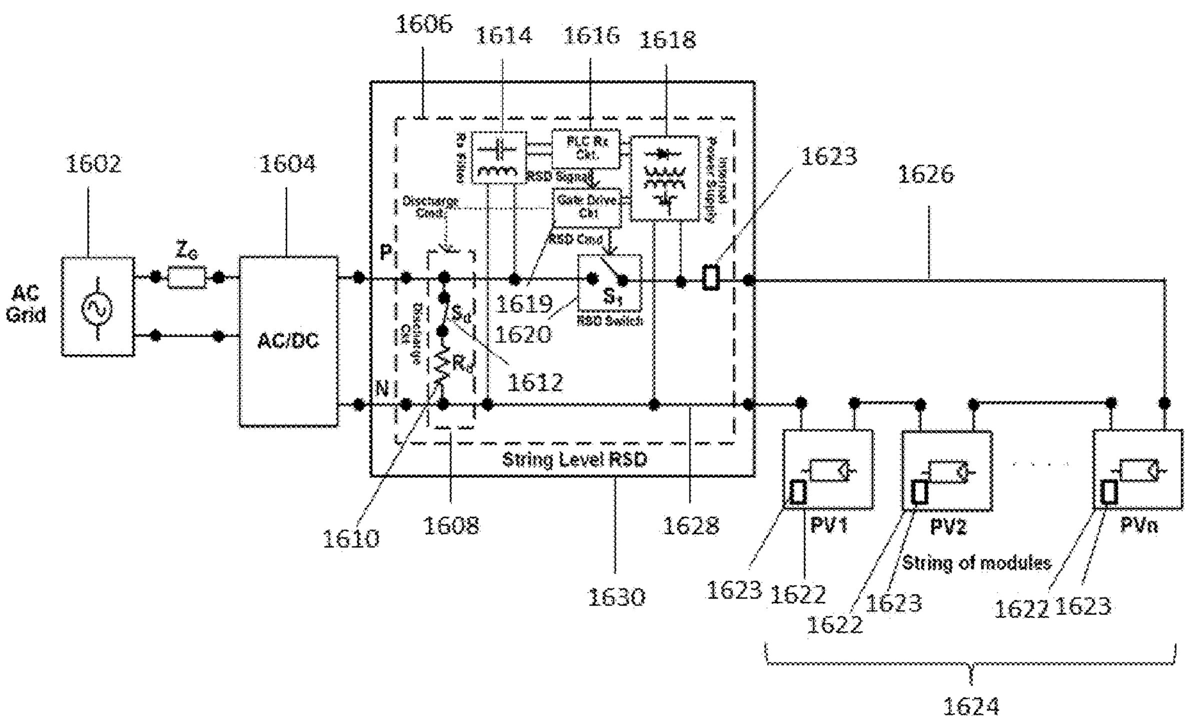

Referring to FIG. 16, in certain embodiments, an exemplary rapid shutdown device 1606 in a rapid shutdown device system 1600 is schematically illustrated. In certain embodiments, the rapid shutdown device 1606 may be utilized with any of the photovoltaic shingles, modules, and systems of FIGS. 1-15. In certain embodiments, the rapid shutdown device 1606 may be configured to stop or reduce the voltage and current generated or otherwise coming from a photovoltaic string 1624 of photovoltaic modules 1622, such as a photovoltaic string 1624 installed on a roof or other part of a structure, such as, but not limited to, a building, a home, an office, a telephone pole, an antenna, a farm, any type of physical structure, or any combination thereof. Such a capability is especially desirable in the event that a hazard is present in a vicinity of the structure, the photovoltaic string 1624, the general environment in which the structured is located, or any combination thereof. The hazard, for example, may be a fire, an event that that increases susceptibility to electric shock, a temperature or temperature range, weather-related hazards (e.g., hail, storms, wind, etc.), moisture, humidity, malfunctioning of a photovoltaic module, an electrical short, any type of hazard, or any combination thereof. In certain embodiments, the rapid shutdown device may include a switch (e.g., disconnect switch 1620) that may act as an on/off switch for the photovoltaic string 1624. In certain embodiments, for example, the rapid shutdown device 1606 may include a single (i.e., monopole) disconnect switch 1620 so that one location in one of the power lines (e.g., power line 1626) may be opened.

In certain embodiments, the rapid shutdown device system 1600 may include a grid supply 1602, an inverter 1604

(e.g., an AC to DC inverter configured to convert direct current into alternating current usable by the grid supply 1602, a rapid shutdown device 1606, a first power line 1626, a second power line 1628, a housing 1630 to enclose some or all of the rapid shutdown device 1606 (e.g., a housing comprising a non-conductive material), photovoltaic modules 1622, one or more sensors 1623, a photovoltaic string 1624 containing one or more photovoltaic modules 1622, any other componentry, or any combination thereof. In certain embodiments, the grid supply 1602 (or grid power supply) may be an AC grid that may serve as the componentry and/or location at which the rapid shutdown device system 1600 connects to an electrical grid, such as provided by a utility company. In certain embodiments, the grid supply 1602 may include grid connection equipment to facilitate connection of the photovoltaic string 1624 and system 1600 to the electrical grid. Power generated by the photovoltaic modules 1622 of the photovoltaic string 1624 may be supplied to the grid supply 1602 for use in the electrical grid, where it may be consumed. In certain embodiments, the inverter 1604 may be configured to convert direct current electricity generated by the photovoltaic modules 1622 of the photovoltaic string 1624 into alternating current electricity that may be utilized by the grid supply 1602. In certain embodiments, the alternating current electricity may be utilized to power electrical devices and systems within, on, around, or otherwise in a vicinity of the structure (e.g., a home) upon which the rapid shutdown device system 1600 is secured.

In certain embodiments, the photovoltaic modules 1622 may be any type of photovoltaic modules that may be configured to generate energy, such as direct current electricity, based on exposure of surfaces of the photovoltaic modules 1622 to light, such as sunlight. In certain embodiments, the photovoltaic string 1624 may include one or more photovoltaic modules 1622 that may be electrically connected in series, parallel, or other electrical configuration. In certain embodiments, photovoltaic string 1624 may include two or more photovoltaic modules 1622, three or more photovoltaic modules 1622, four or more photovoltaic modules, or any number of photovoltaic modules 1622. In certain embodiments, a plurality of photovoltaic modules 1622 may include at least two photovoltaic modules 1622.

In certain embodiments, the rapid shutdown device 1606 may include and/or be connected to a plurality of componentry. For example, in certain embodiments, the rapid shutdown device 1606 may include, but is not limited to including, a discharge circuit 1608, a receiver filter 1614, a receiver circuit 1616, an internal power supply 1618, a gate drive circuit 1619, a rapid shutdown switch 1620 (i.e., a disconnect switch 1620), a housing 1630 configured to house the rapid shutdown device 1606, or any combination thereof. In certain embodiments, the componentry of the rapid shutdown device 1606 may be connected to a first power line 1626, a second power line 1628, or any combination thereof. In certain embodiments, for example, the discharge circuit 1608, the receiver filter 1614, the internal power supply 1618, or any combination thereof, may be connected to both the first power line 1626 and the second power line 1628. In certain embodiments, the rapid shutdown switch 1620 may only be connected to the first power line 1626. In certain embodiments, the receiver circuit 1616 may be connected to the internal power supply 1618, the gate drive circuit 1619, the receiver filter 1614, or any combination thereof. In certain embodiments, the gate drive circuit 1619 may be connected to the receiver circuit 1616, the internal power supply 1618, and the rapid shutdown device switch 1620.

In certain embodiments, the sensors 1623 may optionally be included in the rapid shutdown device system 1600. In certain embodiments, the sensors 1623 or other componentry may be configured to measure the operating status associated with each photovoltaic module 1623 of the photovoltaic string 1624. In certain embodiments, the rapid shutdown device system 1600 may be configured to measure the operative status without the need for the sensors 1623. In certain embodiments, the sensors 1623 may be on the photovoltaic modules 1622, in a vicinity of the photovoltaic modules 1622, in a vicinity of the rapid shutdown device 1606, in and/or on the rapid shutdown device 1606, and/or any other location at which sensor data may be obtained relating to the photovoltaic string 1624. In certain embodiments, the sensors 1623 may include, but are not limited to, humidity sensors, temperature sensors, pressure sensors, motion sensors, cameras, laser scanners, accelerometers, gyroscopes, light sensors, acoustic sensors, any type of sensors, or any combination thereof. In certain embodiments, the sensor data obtained from the sensors 1623 may indicate an operating status including, but not limited to, a temperature, a temperature rise, an electrical arc event, a moisture level, a voltage, an amperage, a wattage, a malfunction, a weather event, a tampering event, a movement (e.g., of the modules or movement of an object in a vicinity of the string 1624), a speed of the movement, a light change, a sound (e.g., a sound of thunder or other sound indicative of potential or actual hazardous conditions), any type of operating status, or any combination thereof. In certain embodiments, the operating status may be utilized to determine whether or not a hazard that may impact the performance of the photovoltaic string 1624, cause potential injury, cause damage to the componentry of the photovoltaic string 1624, roof, and/or structure, any other type of hazard, or any combination thereof.

For the rapid shutdown device 1606 and system 1600, upon the receipt of an electronic photovoltaic string status signal including sensor data from the one or more sensors 1623, the rapid shutdown device 1606 may determine the presence of a hazard based on the sensor data included in the status signal. If there is no hazard, the rapid shutdown device 1606 may keep the switch 1620 in a closed configuration such that the electrical connection between the photovoltaic string 1624 and the inverter 1604 and grid supply 1602 is maintained. On the other hand, if the rapid shutdown device 1606 detects that a hazard is present based on the status signal, the rapid shutdown device 1606 may cause the switch 1620 to open, thereby disconnecting the electrical connection between the photovoltaic string 1624 and the inverter 1604 and grid supply 1602. When the switch 1620 is opened, the discharge switch 1612 of the discharge circuit may operate complementary to the switch 1620 to establish with the discharge resistor 1610 a discharge path between the positive and negative terminals of the rapid shutdown device 1606. For example, in certain embodiments, when the switch 1620 is closed, the discharge switch 1612 may be opened and vice versa.

In certain embodiments, the disconnect switch 1620 may be a high voltage switch that may be configured to disconnect the first power line 1626 when the disconnect switch 1620 is open. In certain embodiments, the high voltage switch may be a switch for disconnecting or connecting electrical circuits handling voltage ranges of greater than 1000 AC RMS voltage or greater than 1500 DC voltage. In certain embodiments, high voltage may mean any voltage capable of facilitating electrical arc generating or causing injury risk or harm to a person or animal. In certain embodiments, the disconnect switch 1620 may have a blocking voltage exceeding a string voltage associated with power generated by the photovoltaic string 1624. The power associated with the string voltage may be generated, such as when the photovoltaic modules 1622 are exposed to sunlight while installed on a roof of a structure. Once the sensors 1623 generate sensor data by conducting measurements associated with the operating status of the photovoltaic string 1624, the sensors 1623 may transmit at least one electronic photovoltaic string status signal to a communication circuit of the rapid shutdown device system 1600. In certain embodiments, the communication circuit may include one or more of the componentry illustrated in FIG. 16. For example, the communication circuit may include the receiver filter 1606, the receiver circuit 1616, the power supply 1618 (e.g., internal power supply), other componentry, or any combination thereof. In certain embodiments, the rapid shutdown device 1600 may include the receiver circuit 1616 and power circuit, which may include gate drive circuit 1619. In certain embodiments, the receiver circuit 1616 may serve as the receiving end of the communication protocol between the rapid shutdown device 1606 and inverter 1604, which may be configured to receive the stay-on or shutdown command and enable the photovoltaic cells of the string 1624 to generate power or stop generating power accordingly. The communication may be implemented through a hard wire and utilize protocols such as serial, CAN, etc. or custom logic codes or analog voltage levels. In certain embodiments, wireless communication may be implemented such as WiFi, Zigbee, and the like. In certain embodiments, PLC may be used so that the data is modulated through the power lines/cables connecting the inverter 1604 to the string of photovoltaic cells/modules 1624. When using PLC, the receiver filter 1606 may be configured to extract the signal sent through the power line (e.g., power line 1626). In certain embodiments, a demodulator circuit of the communication circuit may translate the PLC signal containing an electronic photovoltaic string status/operating status to a status command, which may be utilized to determine the configuration of the power circuit containing the gate drive circuit 1619 (e.g., disconnect the switch or have the switch remain closed). For example, if the operating status indicates the presence of a hazard, the command may be utilized to cause the switch 1620 to open, thereby disconnecting the photovoltaic string 1624 from a grid power supply 1602, inverter 1604, and/or other componentry.

In certain embodiments, the internal power supply 1618 may be configured to reduce the power generated by the photovoltaic string 1624 to a high voltage switch power associated with drive the disconnection switch 1620 (i.e., the high voltage switch). In certain embodiments, the internal power supply 1618 may be configured to power one or more of the circuits of the rapid shutdown device 1606. In certain embodiments, the internal power supply 1618 may be configured to remove noise and variance from power generated by the photovoltaic string 1624. In certain embodiments, the receiver filter 1606 may be configured to detect at least one power line communication (or other type of communication) comprising the at least one electronic photovoltaic string status signal, such as may be provided by a sensor (e.g. sensor 1623) measuring data associated with the photovoltaic cells 1624. The receive filter 1606 may provide the communication including the signal to the receiver circuit 1616, which may demodulate the communication and generate a command for the rapid shutdown device 1600 to either stay closed (on) or disconnect (off). In certain embodiments, if the rapid shutdown device 1600 disconnects the electrical connection by opening the switch 1620, the inverter voltage may be discharged either through the discharge circuit 1608 built-into the inverter 1604 or in the rapid shutdown device 1600.

In certain embodiments, the gate drive circuit 1619 may be configured to receive the electronic photovoltaic string status signal indicative of the operating status of the photovoltaic string 1624. In certain embodiments, the gate drive circuit 1619 may be configured to utilize the high voltage switch power form the internal power supply 1618 to generate a high voltage switch command signal to drive the disconnect switch 1620 (i.e., the high voltage switch). In certain embodiments, the gate drive circuit 1619 may be configured to determine that the operating status of the photovoltaic string 1624 is indicative of a hazard base based on analyzing the at least one electronic photovoltaic string status signal. In certain embodiments, the operating status may be indicative of a hazard based on the sensor data and/or status signal satisfying a threshold value associated with a hazard (e.g., threshold temperature, moisture, etc.), indicating occurrence of an event (e.g., a camera detected that a portion of a module 1622 has been damaged, that moisture has seeped into a portion of the module 1622, that a storm is present, etc.), Based on the operating status indicating the hazard, the gate drive circuit 1619 may be configured to generate a high voltage switch command signal to cause the disconnect switch 1620 to open so as to disconnect the photovoltaic string 1624 from at least one electrical connection to a grid power supply 1602 with the block voltage exceeding the string voltage. In certain embodiments, the high voltage switch command signal may be an electrical signal that may be utilized be utilized to activate the switch to close or open. When the disconnect switch 1620 is opened, the rapid shutdown device 1606 may rapidly shutdown the photovoltaic string 1624 and its modules 1622 via the disconnect switch 1620.

Figure 17:
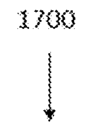
FIG. 17 illustrates a rapid shutdown device and system according to embodiments of the present disclosure.
Figure 17:
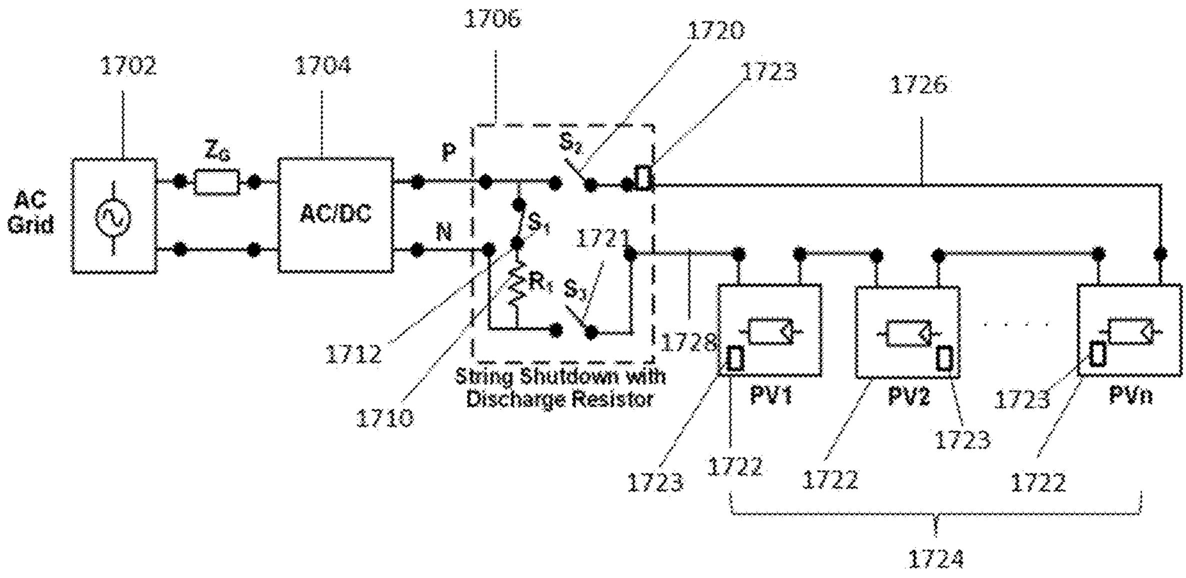

Referring now also to FIG. 17, rapid shutdown device 1706 and system 1700 according to embodiments of the present disclosure is shown. In certain embodiments, the rapid shutdown device 1706 and system 1700 may include any of the componentry and functionality provided by the rapid shutdown device 1606 and system 1600. According to embodiments of FIG. 17, the rapid shutdown device system 1700 may include a grid supply 1702 (e.g., AC grid), an inverter 1704 (e.g., string inverter), a rapid shutdown device 1706, a first disconnection switch 1720 (i.e., S2) on a first power line 1726, a second disconnection switch 1721 (i.e., S3) on a second power line 1728, a discharge switch 1712 (i.e., S1), a discharge resistor 1710, a plurality of photovoltaic modules 1722, sensors 1723 and a photovoltaic string 1724 including one or more photovoltaic modules 1722. In the configuration of FIG. 17, the disconnection switch 1720 and the disconnection switch 1721 may serve as a dipole configuration, whereby the circuit is opened or closed to disconnect or reconnect the photovoltaic string 1724 from an electrical connection with the inverter 1704 and/or grid supply 1702 based on the opening or closing of both disconnection switches 1720, 1721.

In certain embodiments, the sensors 1723 may optionally be included in the rapid shutdown device system 1700. In certain embodiments, the sensors 1723 or other componentry may be configured to measure the operating status associated with each photovoltaic module 1722 of the photovoltaic string 1724. In certain embodiments, the rapid shutdown device system 1700 may be configured to measure the operative status without the need for the sensors 1723. In certain embodiments, the sensors 1723 may be on the photovoltaic modules 1722, in a vicinity of the photovoltaic modules 1722, in a vicinity of the rapid shutdown device 1706, in and/or on the rapid shutdown device 1706 and/or any other location at which sensor data may be obtained relating to the photovoltaic string 1724. In certain embodiments, the sensors 1723 may include, but are not limited to, humidity sensors, temperature sensors, pressure sensors, motion sensors, cameras, laser scanners, accelerometers, gyroscopes, light sensors, acoustic sensors, any type of sensors, or any combination thereof. In certain embodiments, the sensor data obtained from the sensors 1723 may indicate an operating status including, but not limited to, a temperature, a temperature rise, an electrical arc event, a moisture level, a voltage, an amperage, a wattage, a malfunction, a weather event, a tampering event, a movement (e.g., of the modules or movement of an object in a vicinity of the string 1724), a speed of the movement, a light change, a sound (e.g., a sound of thunder or other sound indicative of potential or actual hazardous conditions), any type of operating status, or any combination thereof. The operating status may be utilized to determine whether or not a hazard that may impact the performance of the photovoltaic string 1724, cause potential injury, cause damage to the componentry of the photovoltaic string 1724, roof, and/or structure, any other type of hazard, or any combination thereof.

For the rapid shutdown device 1706 and system 1700, upon the receipt of a status signal including sensor data from the one or more sensors 1723, the rapid shutdown device 1706 may determine the presence of a hazard based on the sensor data included in the status signal. If there is no hazard, the rapid shutdown device 1706 may keep the switches 1720, 1721 in a closed configuration such that the electrical connection between the photovoltaic string 1724 and the inverter 1704 and grid supply 1702 is maintained. On the other hand, if the rapid shutdown device 1706 detects that a hazard is present based on the status signal, the rapid shutdown device 1706 may cause the switches 1720, 1721 to open, thereby disconnecting the electrical connection between the photovoltaic string 1724 and the inverter 1704 and grid supply 1702. When the switches 1720, 1721 are opened, the discharge switch 1712 of the discharge circuit may operate complementary to the switches 1720, 1721 to establish with the discharge resistor 1710 a discharge path between the positive and negative terminals of the rapid shutdown device 1706. For example, in certain embodiments, when the switches 1720, 1721 are closed, the discharge switch 1721 may be opened and vice versa.

In certain embodiments, the sensors 1723 may generate further sensor data that are included in a different electronic photovoltaic status string signal associated with a subsequent operating status of the photovoltaic string. The rapid shutdown device 1706 and system 1700 may determine, based on the different string signal that the subsequent operating status indicates that the hazard is no longer present. Based on the subsequent operating status indicating that the hazard is no longer present, the rapid shutdown device 1706 and system 1700 may generate a switch command signal that may be configured to cause the switches 1720, 1721 to close so as to reconnect the photovoltaic string 1724 to the electrical connection connecting the photovoltaic string 1724 to the inverter 1704 and grid supply 1702.

Figure 18:
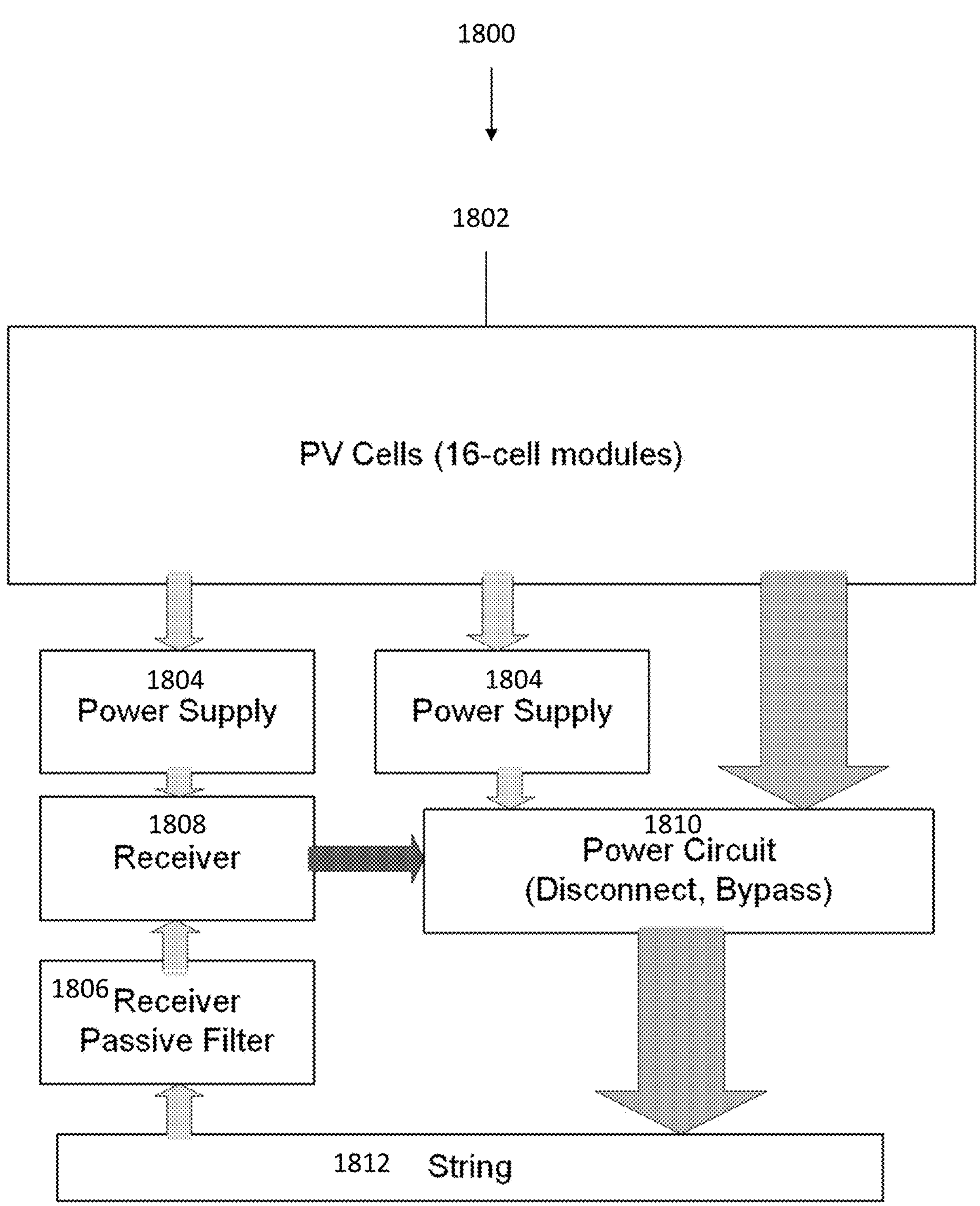
FIG. 18 illustrates a block diagram of an exemplary rapid shutdown device according to embodiments of the present disclosure.

Referring now also to FIG. 18, an exemplary block diagram of a rapid shutdown device system 1800 that may be utilized to support the functionality described in the present disclosure is schematically illustrated. In certain embodiments, the rapid shutdown device system 1800 may include a plurality of componentry to support the functionality described in the present disclosure. In certain embodiments, the plurality of componentry may include, but is not limited to, photovoltaic cells (e.g., in 16-cell modules and/or strings of modules) 1802, power supplies 1804, a receiver passive filter 1806, a receiver 1808 (e.g., a receiver circuit), a power circuit 1810 (e.g., for disconnecting or bypassing electrical connections), a string inverter 1812, any other componentry, or a combination thereof. In certain embodiments, the photovoltaic cells 1802 and/or the photovoltaic string containing the cells 1802 may be configured to be installed on a roof to generate energy from sunlight contacting the photovoltaic cells 1802 and/or the modules of the photovoltaic string. The energy may then be converted from direct current electricity to alternating current electricity so that the energy generated by the cells 1802 may be utilized for appliances, electronic devices, and/or an electrical grid connected to the cells 1802 and/or photovoltaic string.

In certain embodiments, multiple power supplies 1804 may be implemented for different sub-circuits of the rapid shutdown device of the rapid shutdown device system 1800 (or other rapid shutdown devices described in the present disclosure). For example, a power supply 1804 may be utilized for the receiver circuit 1808 and another power supply 1804 may be utilized for the power circuit 1810. In certain embodiments, one power supply 1804 may be used for multiple components or sub-circuits of the rapid shutdown device. In certain embodiments, the receiver passive filter 1806 may be connected to the string inverter 1812 (configured to convert direct current energy output to alternating current energy output) and to power lines connecting the componentry of the rapid shutdown device system 1802 together. In certain embodiments, the receiver passive filter 1806 may be configured to detect at least one power line communication (or other type of communication) comprising the at least one electronic photovoltaic string status signal, such as may be provided by a sensor (e.g. sensor 1623) measuring data associated with the photovoltaic cells 1802.

In certain embodiments, the rapid shutdown device 1800 may include a communication circuit that includes one or more of the componentry illustrated in FIG. 18, for example. For example, the communication circuit may include the receiver passive filter 1806, the receiver circuit 1808, the power supply 1804 (e.g., internal power supply), other componentry, or any combination thereof. In certain embodiments, key sub-circuits of the rapid shutdown device 1800 may include the receiver circuit 1808 and power circuit 1810. In certain embodiments, the receiver circuit 1808 may serve as the receiving end of the communication protocol between the rapid shutdown device 1802 and inverter 1812, which may be configured to receive the stay-on or shutdown command and enable the photovoltaic cells 1802 of the string to generate power or stop generating power accordingly. The communication may be implemented through a hard wire and utilize protocols such as serial, CAN, etc. or custom logic codes or analog voltage levels. In certain embodiments, wireless communication may be implemented such as WiFi, Zigbee, and the like. In certain embodiments, PLC may be used so that the data is modulated through the power lines/cables connecting the inverter 1812 to the string of photovoltaic cells/modules 1802. When using PLC, the receiver passive filter 1806 may be configured to extract the signal sent through the power line. In certain embodiments, a demodulator circuit of the communication circuit may translate the PLC signal containing an electronic photovoltaic string status/operating status to a status command, which may be utilized to determine the configuration of the power circuit 1810 (e.g., disconnect the switch or have the switch remain closed). For example, if the operating status indicates the presence of a hazard, the command may be utilized to cause the switch to open, thereby disconnecting the string of cells 1802 from a grid supply, inverter 1812, and/or other componentry.

In certain embodiments, the communication circuit may be also implemented by a bidirectional receiver/transmitter method or process. In such a scenario, in addition to the primary function of the rapid shutdown device receiver circuit 1808, other information may be transmitted back to the inverter 1812, user of the rapid shutdown device system, other devices, or any combination thereof. In certain embodiments, the power circuit 1810 may include switching devices (e.g. voltage switches), such as relays or solid-state switches such as MOSFET, IGBT, or thyristors. In certain embodiments, the switches may be configured according to the status signal. An exemplary configuration of the power circuit includes two switches (e.g., S2 and S3 in FIG. 17). When the switches are open, the photovoltaic cells of the string of cells 1802 may be disconnected from the inverter 1812. When the switches are closed, the string of photovoltaic cells 1802 may be energized and connected to the inverter 1812. In certain embodiments, only one switch may be employed in the power circuit 1810, such as in a monopole configuration. For example, either one of S2 or S3 may remain in the circuit and the other switch may be replaced with a conductive connection.

In certain embodiments, the rapid shutdown device 1800 may include a discharge circuit that may include a switch and discharge resistor (e.g., S1 and R1 in FIG. 17 or $S_a$ and $R_d$ in FIG. 16) to de-energize any charge at the output of the inverter 1812. In such an implementation, S1 may be closed when S2 and/or S3 are open and S1 may be closed when those switches are closed. As a result, the status of S1 may be complementary to the status of S2 and S3. In certain embodiments, the discharge circuit may be transformed to the inverter 1812 and not implemented within the rapid shutdown device 1800. In certain embodiments, the receiver circuit 1808 outputs a command to the power circuit 1810. The command may be changed according to the state of operation through a gate drive circuit. In certain embodiments, the rapid shutdown device 1800 may be configured to incorporate any of the functionality and/or componentry of the other rapid shutdown devices and/or systems described herein.

In certain embodiments, the rapid shutdown devices described in the present disclosure may come in a variety of form factors. In certain embodiments, the form-factors for the rapid shutdown devices and/or systems may be designed to match the functionality and aesthetics of a building-integrated photovoltaic module system or in-roof solar system. Referring now also to FIG. 19, a rapid shutdown device 1900 is shown that has a flat design designed to fit within a transition box utilized with the photovoltaic string and rapid shutdown device and/or system. Additionally, in certain embodiments, the flat design of the rapid shutdown device 1900 may be such that the thickness of the rapid shutdown device 1900 is substantially lower than the length and the width of the device, as shown in FIG. 19. In certain embodiments, the rapid shutdown device 1900 may be sized and shaped to fit any type of enclosure, such as an enclosure that may be mounted onto a roof, an enclosure in an attic, an enclosure on a wall adjacent to the photovoltaic string, or any combination thereof. In certain embodiments, the rapid shutdown device 1900 may include and/or be connected to an inverter 1902 and an array of photovoltaic cells and/or modules 1904.

As another form-factor example and referring now also to FIG. 20, a rapid shutdown device 2000 is shown that has a slim design, where the length of the design is configured to be long than the width and length of the rapid shutdown device 2000. In certain embodiments, the rapid shutdown device 2000 may be electrically connected to an inverter and an array (or substring) of photovoltaic modules. In certain embodiments, the rapid shutdown device 2000 is sized and shaped to fit in a wireway, wire-channel, wire duct, or any combination thereof. In certain embodiments, the rapid shutdown device 2000 (or other rapid shutdown devices and systems described herein) may be configured to support various electrical system ratings including, but not limited to, a maximum system voltage of 600 VDC, a rated input current of 10 A DC, and a rated input operating voltage of between 50-550 V DC. In certain embodiments, the rapid shutdown devices may be configured to support various communication and other requirements. In certain embodiments, the rapid shutdown devices of the present disclosure may utilize a monopole method of disconnecting the photovoltaic string from the electrical connection to the grid supply. In certain embodiments, the method of disconnection may be dipole (i.e., having a disconnection switch on two power lines connected to the photovoltaic string and the grid supply and/or inverter.

In certain embodiments, the control signal technology utilized may involve the use of PLC circuitry and two-way PLC as an added benefit to the performance of the rapid shutdown device and/or system. In certain embodiments, the system voltage at the output (i.e., after a disconnect occurs) may include having an open circuit (i.e., complies with NEC 2014<30 V in 30 seconds). In certain embodiments, the rapid shutdown systems may include bleeding resistors in a first configuration (i.e., bleeding circuit may be within the rapid shutdown device). In certain embodiments, the rapid shutdown device systems may include bleeding resistors in a second configuration (e.g., bleeding circuit is out of the rapid shutdown device itself).

In certain embodiments, the rapid shutdown devices may be configured to support various thermal and performance requirements. For example, in certain embodiments, the operating temperature for the rapid shutdown devices and/or systems may range from 40 to 185° F. (−40 to 85° C.), the ambient temperature (max) may be above 40° C. with a target temperature of 50° C., the protection utilized may be over-temperature shutdown above safe operation of the photovoltaic string and/or rapid shutdown system, the device-power consumption may be such that thermal requirements are satisfied, the storage temperature for the rapid shutdown devices and/or systems may range from −40 to 185° F. (−40 to 85° C.), the humidity for the rapid shutdown devices and/or systems may range from 0-100%, the operating altitude may range from 2000 m to a target of 3500 m above sea level, and the EMC may be such that interference is avoided with arc-fault detection on inverters.

In certain embodiments, the rapid shutdown devices may be configured to support various mechanical requirements. In certain embodiments, for example, the rapid shutdown device 2000 may have dimensions of L×W×D (mm) (e.g., (127−178)+\−3×(25−31.75)+/−1×(17−20)+/−1), have various weights, utilize DC input/output connectors, utilize various cable types and sizes (e.g., PV wire, 14-12 AWG), have various cable lengths (e.g., measured from the housing the rapid shutdown device to the beginning of the connector; 25±5 (In&Out Pos), 127±5 (In&Out Neg)), enclosure materials (e.g., non-metallic without needing any additional group table, and various type of brackets. In certain embodiments, the rapid shutdown devices and systems may also be configured to comply with various standards including, but not limited to, UL1741, UL 61730, UL 1699B to meet AFCI performance, UL 3741 for firefighter's interaction/hazard control, IEC-61000-4-2 for ESD, PVRSE certification, FCC Part 15 Class B, NEC 2014, NEC 2020 Article 690.12, Sunspec PLC, among other standards. In certain embodiments, no heat sink is required for the rapid shutdown device and/or systems described in the present disclosure.

Figure 21:
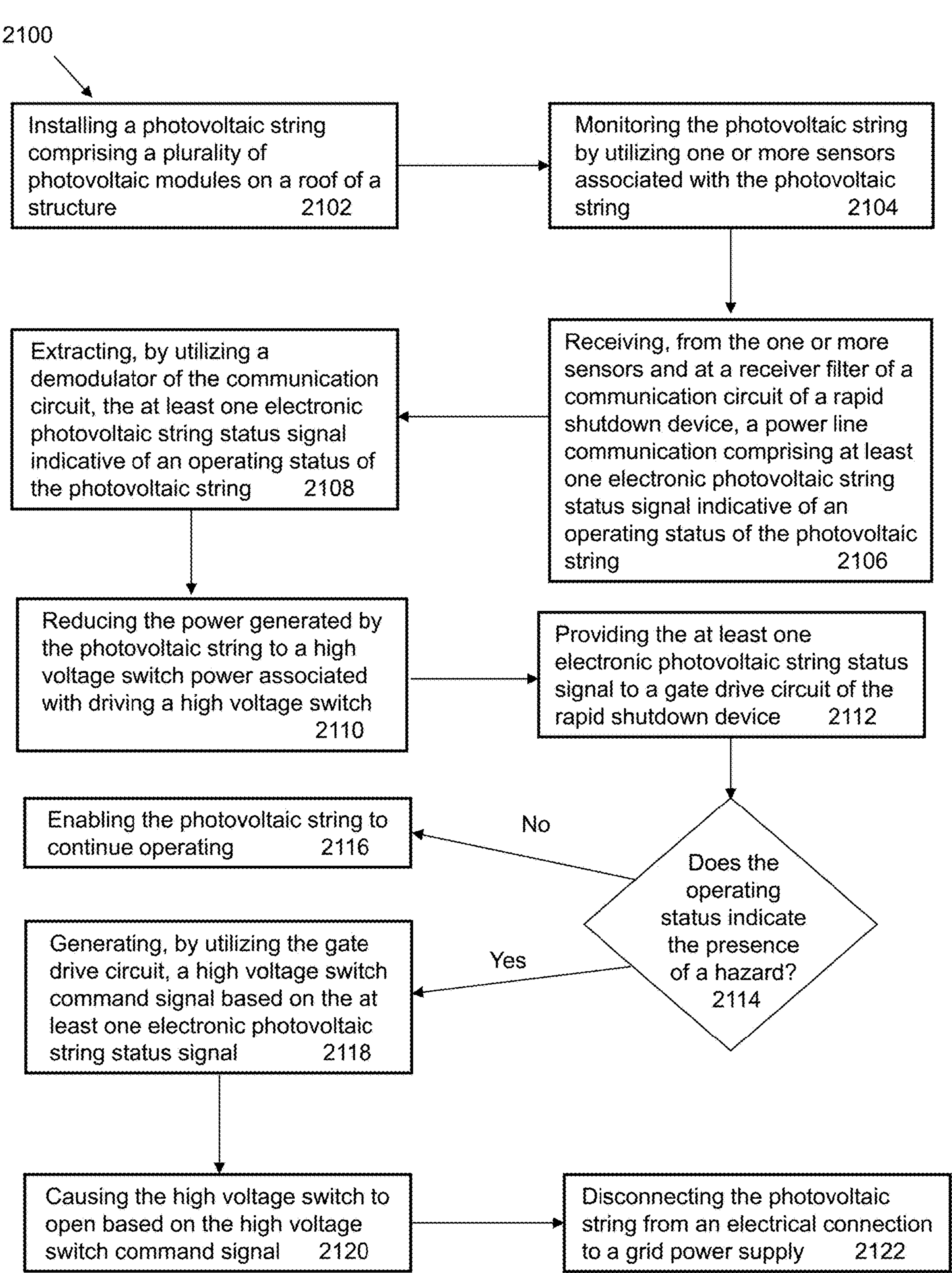
FIG. 21 illustrates and exemplary method for utilizing a rapid shutdown device according to embodiments of the present disclosure.

Referring now also to FIG. 21, an exemplary method 2100 for utilizing a rapid shutdown device according to embodiments of the present disclosure. In certain embodiments, the method 2100 may utilize any of the rapid shutdown devices illustrated in FIGS. 13-16 and any of the componentry and devices of FIGS. 1-15 to perform the operative functionality of the method 2100. In certain embodiments, the method 2100 provides steps for monitoring a photovoltaic string installed on a roof of a structure to detect the presence of hazards the may pose risk of damage to the roof, the structure, the photovoltaic modules of the photovoltaic string, and to individuals that may be in a vicinity of the structure. Upon detection of a hazard, the method 2100 may include generating a command to cause a high voltage switch connected to a power line connected to the photovoltaic string to open, thereby causing the photovoltaic string to be disconnected from an electric connection to a grid power supply.

At step 2102, the method 2100 may include installing a photovoltaic string including one or more photovoltaic modules on a roof of a structure, such as a building or home. At step 2104, the method 2100 may include monitoring the photovoltaic string by utilizing one or more sensors associated with the photovoltaic string. For example, the sensors may be sensors of photovoltaic modules of the photovoltaic string, sensors in proximity to the photovoltaic modules of the photovoltaic string, sensors capable of sensing operating conditions associated with the photovoltaic string, or any combination thereof. At step 2106, the method 2100 may include receiving, from the one or more sensors and at a receiver filter of a communication circuit of the rapid shutdown device, a power line communication (or other communication based on implementation) including at least one electronic photovoltaic string status signal indicative of an operating status of the photovoltaic string.

At step 2108, the method 2100 may include extracting, such as by utilizing a demodulator circuit of the communication circuit of the rapid shutdown device, the at least one electronic photovoltaic string status signal indicative of the operating status of the photovoltaic string from the electronic photovoltaic string status signal. At step 2110, the method 2100 may include reducing, at the rapid shutdown device componentry, the power generated by the photovoltaic string to a high voltage switch power associated with driving a high voltage switch of the rapid shutdown device. At step 2112, the method 2100 may include providing the at least one electronic photovoltaic string status signal to a gate drive circuit of the rapid shutdown device. At step 2114, the method 2100 may include determining whether the operating status determined from the at least one electronic photovoltaic string status signal indicates the presence of a hazard associated with the photovoltaic string.

If, at step 2114, the operating status does not indicate the presence of a hazard, the method 2100 may proceed to step 2116, which may include enabling the photovoltaic string to continue operating. If, however, at step 2114, the operating status indicates the presence of a hazard, the method 2100 may proceed to step 2118. At step 2118, the method 2100 may include generating, such as by utilizing the gate drive circuit of the rapid shut down device, a high voltage switch command signal based on the at least one electronic photovoltaic string status signal. In certain embodiments, the high voltage switch command signal may be received by the high voltage switch connected to a power line supporting an electrical connection between the photovoltaic string and a grid supply, such as grid supply connected to an electric grid. The electrical connection may be any type of electrical componentry, structure or connection that allows electricity, communications, or a combination thereof, to flow through the electrical connection and to and/or from any devices and/or componentry connected thereto. At step 2120, the method 2100 may include causing the high voltage switch to open based on the high voltage switch command signal. At step 2122, the electrical connection between the photovoltaic string and the grid supply may be disconnected, thereby rapidly shutting down the photovoltaic string and minimizing the potential effects of hazards. In certain embodiments, the method 2100 may incorporate any of the other functionality, devices, and/or componentry described in the present disclosure and is not limited to the specific steps or sequence of steps illustrated in FIG. 21. The method 2100 may continually operate, operate at intervals, operate based on execution of commands or input devices, or any combination thereof.

The illustrations of arrangements described herein are intended to provide a general understanding of the structure of various embodiments, and they are not intended to serve as a complete description of all the elements and features of devices and systems that might make use of the structures described herein. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Thus, although specific arrangements have been illustrated and described herein, it should be appreciated that any arrangement calculated to achieve the same purpose may be substituted for the specific arrangement shown. This disclosure is intended to cover any and all adaptations or variations of various embodiments and arrangements of the invention. Combinations of the above arrangements, and other arrangements not specifically described herein, will be apparent to those of skill in the art upon reviewing the above description. Therefore, it is intended that the disclosure is not limited to the particular arrangement(s) disclosed as the best mode contemplated for carrying out this invention, but that the invention will include all embodiments and arrangements falling within the scope of the appended claims.

The foregoing is provided for purposes of illustrating, explaining, and describing embodiments of this invention. Modifications and adaptations to these embodiments will be apparent to those skilled in the art and may be made without departing from the scope or spirit of this invention. Upon reviewing the aforementioned embodiments, it would be evident to an artisan with ordinary skill in the art that said embodiments can be modified, reduced, or enhanced without departing from the scope and spirit of the claims described below.

We claim:

1. A device, comprising:

a first power line and a second power line configured to connect to a photovoltaic string comprising a plurality of photovoltaic modules;

a high voltage switch comprising a first disconnection switch on the first power line and a second disconnection switch on the second power line, wherein the high voltage switch is configured to:

electrically disconnect the first power line and the second power line while the high voltage switch is open, wherein the high voltage switch is configured to have a blocking voltage exceeding a string voltage, wherein the string voltage is associated with power generated by the photovoltaic string;

a communication circuit comprising a receiver filter connected to the first power line or the second power line and configured to detect at least one power line communication comprising an electronic photovoltaic string status signal associated with an operating status of the photovoltaic string;

a gate drive circuit configured to:

receive the electronic photovoltaic string status signal associated with the operating status of the photovoltaic string;

determine that the operating status of the photovoltaic string indicates a hazard based on the electronic photovoltaic string status signal; and generate, based on the operating status of the photovoltaic string indicating the hazard, a high voltage switch command signal configured to cause the high voltage switch to open so as to electrically disconnect the photovoltaic string from an electrical connection to a grid power supply; and a discharge circuit having a discharge switch between a positive terminal and a negative terminal of the device, wherein the discharge circuit is configured to:

drive the discharge switch complementary to the high voltage switch comprising the first disconnection switch and the second disconnection switch to establish a discharge path between the positive terminal and the negative terminal.

2. The device of claim 1, wherein the communication circuit further comprises an internal power supply configured to: convert the string voltage to a voltage switch power to drive the high voltage switch.

3. The device of claim 2, wherein the gate drive circuit is further configured to:

utilize power generated by the internal power supply to generate the high voltage switch command signal.

4. The device of claim 1, further comprising a housing configured to house the high voltage switch, the gate drive circuit, the discharge circuit, or a combination thereof.

5. The device of claim 1, further comprising a communication circuit implemented via a bidirectional transmitter, receiver, or a combination thereof.

6. The device of claim 1, wherein the gate drive circuit is further configured to: determine that the operating status of the photovoltaic string does not indicate the hazard based on the electronic photovoltaic string status signal; and maintain, based on the operating status not indicating the hazard, the high voltage switch in a closed configuration.

7. The device of claim 1, wherein the discharge circuit is further configured to: establish the discharge path between the positive terminal and the negative terminal with a discharge resistor of the discharge circuit.

8. The device of claim 1, further comprising an internal power supply configured to power the high voltage switch, the gate drive circuit, the discharge circuit, or a combination thereof.

9. The device of claim 1, wherein the gate drive circuit is further configured to:

determine that the operating status of the photovoltaic string indicates the hazard based on the electronic photovoltaic string status signal satisfying a threshold value associated with presence of the hazard.

10. The device of claim 1, wherein, when the high voltage switch is open, the photovoltaic string is disconnected from the electrical connection to the grid power supply based on disconnecting the photovoltaic string from an inverter connected to the grid power supply.

11. The device of claim 10, further comprising a discharge resistor configured to de-energize a charge at an output of an inverter connected to the photovoltaic string, the grid power supply, or a combination thereof.

12. The device of claim 1, further comprising at least one sensor configured to generate the electronic photovoltaic string status signal.

13. The device of claim 1, wherein the device is further configured to reduce the power generated by the photovoltaic string to a high voltage switch power for driving the high voltage switch.

* * * * *